United States Patent

Onodera

[11] Patent Number: 5,845,146
[45] Date of Patent: Dec. 1, 1998

[54] EXTENDING SYSTEM OF INPUT/OUTPUT CHANNEL

[75] Inventor: Osamu Onodera, Hadano, Japan

[73] Assignee: Hitachi, Ltd., Tokyo, Japan

[21] Appl. No.: 670,316

[22] Filed: Sep. 5, 1996

[30] Foreign Application Priority Data

Sep. 5, 1995 [JP] Japan .................... 7-227724

[51] Int. Cl.[6] .................................................. G06F 9/00
[52] U.S. Cl. ............................................ 395/822; 395/823
[58] Field of Search ...................................... 395/822, 823

[56] References Cited

U.S. PATENT DOCUMENTS 4,504,927 3/1985 Callan ....................................... 395/822
4,591,973 5/1986 Ferris et al. ............................. 395/823

*Primary Examiner*—Krisna Lim
*Assistant Examiner*—David Ovedovitz
*Attorney, Agent, or Firm*—Antonelli, Terry, Stout & Kraus, LLP

[57] ABSTRACT

An extending system in an information processing system which includes an input/output channel and operates a plurality of virtual computers. A plurality of input/output processing units are included in the input/output channel and each virtual computer issues a region ID and a channel path ID. A channel path reconfiguration array is provided having a plurality of channel path reconfiguration array blocks corresponding to region IDs. Each channel path reconfiguration array block includes a plurality of channel path reconfiguration array entries corresponding to channel path IDs and each channel path reconfiguration array entry includes an input/output processing unit number and a channel path ID. A selector is provided for selecting a channel path reconfiguration array block corresponding to the region ID issued by a virtual computer and selecting a channel path reconfiguration array entry corresponding to channel path ID issued by the virtual computer within the selected channel path reconfiguration array block. The virtual computer selects one of the input/output processing units corresponding to the input/output processing number from the selected channel path reconfiguration array entry and accesses the input/output processing circuit using the channel path ID from the selected channel path reconfiguration array entry.

78 Claims, 9 Drawing Sheets

FIG. 4
PRIOR ART

| LPAR NAME | REAL IOP | CHANNEL PATH NUMBER |
|---|---|---|
| LPAR 1 | IOP A | MAXIMUM 256 CHANNEL PATH |
| LPAR 2 | | |
| LPAR 3 | IOP B | MAXIMUM 256 CHANNEL PATH |
| TOTAL | 2 IOP | MAXIMUM 512 CHANNEL PATH |

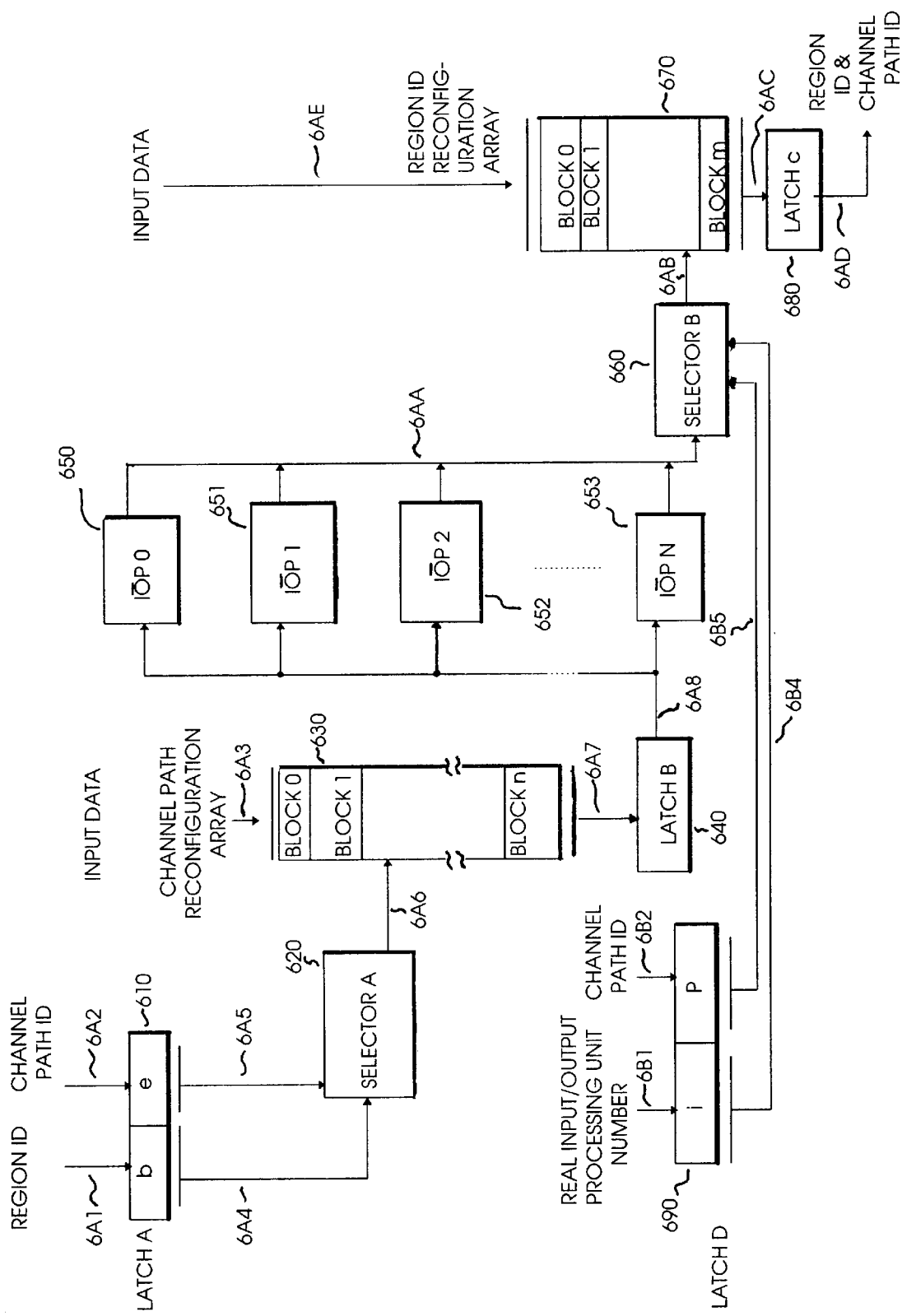

EXTENDING SYSTEM OF INPUT/OUTPUT CHANNEL

BACKGROUND OF THE INVENTION

The present invention relates to an information processing unit, and more particularly the present invention relates to a channel path number extending system of an input/output channel having a function that an input/output channel of an information processing unit is logically divided into a plurality of input/output channel sections.

In general, as a method of making a plurality of operating systems (hereinafter referred to as "OS") act on a single information processing unit, means called a virtual computer (hereinafter referred to as "VM" or "LPAR") is used. In order to realize a LPAR on a single information processing unit, a program called a virtual computer control program (hereinafter referred to as "Hypervisor") acts on a real information processing unit, and a plurality of LPARs are produced under control of the Hypervisor, and further an independent OS acts on each LPAR. Consequently, the function of using hardware resources of the single real information processing unit in each LPAR commonly is added to the Hypervisor.

As a method of using hardware resources of a single real information processing unit in each LPAR commonly, a first method of assigning hardware resources in time division under control of the Hypervisor, a second method of dividing hardware resources logically and assigning the hardware resources to each LPAR exclusively, and a third method of assigning the hardware resources by mixing the above-mentioned first and second methods are disclosed.

FIG. 1 illustrates a configuration of a single real computer system. In the example illustrated in FIG. 1, the real computer system includes two real central processing units (hereinafter referred to as "PIP") 100 and 101, one real memory device (hereinafter referred to as "RMS") 102 and one real input/output processing unit (hereinafter referred to as "IOP") 103.

A channel path (hereinafter referred to as "CHP") 104 is connected to one IOP 103 which executes the input/output operation issued by the PIP 100, 101. The CHP 104 in FIG. 1 includes a group of CHPs, CHP11 104-1, CHP12 104-2 to CHP1n 104-n. Each CHP1n 104-n conducts input/output operations independently. Each CHPn 104-n as above described is connected to input/output device (hereinafter referred to as "DEV") 105, and giving/receiving of data between the input/output device 105 and the real memory device 102 is controlled by the CHPn 104-n.

FIG. 2 illustrates an example of a virtual computer system where two LPARs, namely LPAR1 and LPAR2, are produced on one real computer system and are constituted to act independently as separate LPARs. As illustrated in FIG. 2, the real computer system includes two PIPs, one RMS and one IOP, two systems of LPARs being virtual computers are constituted and each LPAR comprises two logical central processing units (hereinafter referred to as "LIP"), one logical memory device (hereinafter referred to as "LMS") and one logical input/output processing unit (hereinafter referred to as "LIOP").

Hypervisor travels on the two PIPs, and the LPARs act individually under control of the Hypervisor respectively. Processing function of LIPs belonging to respective LPARs is realized in that hardware resources of two PIPs are given in time division under control of the Hypervisor, and LIP11 and LIP12 are assigned to the LPAR1 and LIP21 and LIP22 are assigned to the LPAR2. Storage function of LMSs belonging to respective LPARs is realized in that real storage area of RMS is logically divided under control of the Hypervisor and is assigned to each LPAR exclusively, or it is realized in that virtual storage area produced on the RMS is logically divided and is assigned to each LPAR exclusively, and LMS1 is assigned to the LPAR1 and LMS2 is assigned to the LPAR2.

Input/output operation function of LIOPs belonging to respective LPARs is realized in that the CHP group connected to the IOP is logically divided under control of the Hypervisor and the CHP is assigned to each LPAR exclusively, and LIOP1 is assigned to the LPAR1 and CHP11 and CHP12 are connected to the LIOP1, and LIOP2 is assigned to the LPAR2 and CHP21 and CHP22 are connected to the LIOP2. That is, in FIG. 2, the LPAR1 is a virtual computer constituted by two logical central processing units (LIP11 and LIP12), one logical memory device (LMS1), one logical input/output processing unit (LIOP1) and two channel paths (CHP11 and CHP12) connected to the LIOP1. On the other hand, in FIG. 2, the LPAR2 is a virtual computer constituted by two logical central processing units (LIP21 and LIP22), one logical memory device (LMS2), one logical input/output processing unit (LIOP2) and two channel paths (CHP21 and CHP22) connected to the LIOP2.

As above descried, in a logical dividing method of the IOP for each LPAR in the prior art, the maximum input/output channel number of the IOP can be constituted to the maximum input/output channel number defined by the hardware architecture of the real information processing unit. For example, if length of the assigned data of the channel path defined by the hardware architecture of the real information processing unit is 8 bits, the maximum input/output channel number being assignable is 256 channels.

Consequently in FIG. 2, the total input/output channel number of the assigned input/output channel number in the LPAR1 and the LPAR2 has limitation that the maximum input/output channel number defined by the hardware architecture of the input/output channel number installed as the IOP is the upper limit. In the prior art, in order to assign the input/output channels to a plurality of LPARs beyond such limitation in the total input/output channel number that the maximum input/output channel number defined by the hardware architecture of the input/output channel number installed as the IOP is the upper limit, there is a method that a plurality of IOPs provided with the maximum input/output channel number defined by the hardware architecture are installed, and respective IOPs are assigned to each LPAR fixedly.

Next, using FIG. 3, an example will be described where two real input/output processing units provided with the maximum input/output channel number defined by the hardware architecture are divided logically by a plurality of LPARs. As shown in FIG. 3, on a real computer system comprising two PIPs, one RMS and two IOPs provided with the maximum input/output channel number defined by the hardware architecture, three systems of LPARs being virtual computers are constructed and each LPAR comprises two LIPS, one LMS and one LIOP.

Processing function of LIPs belonging to respective LPARs is realized in that hardware resources of two PIPs are given in time division under control of the Hypervisor, and LIP11 and LIP12 are assigned to the LPAR1, and LIP21 and LIP22 are assigned to the LPAR2 and also LIP31 and LIP32 are assigned to the LPAR3. Regarding the storage function of LMSs belonging to respective LPARs, LMS1 is assigned to the LPAR1, LMS2 is assigned to the LPAR2 and LMS3 is assigned to the LPAR3.

Regarding LIOPs belonging to respective LPARs, the IOPA being the first real input/output processing unit is assigned as LIOP1 and LIOP2 to the LPAR1 and the LPAR2, and the IOPB being the second real input/output processing device is assigned as LIOP3 to the LPAR3. Here, the LIOP1 is assigned to the LPAR1 and CHP30 to CHP3n are connected to the LIOP1, and the LIOP2 is assigned to the LPAR2 and CHP3n+1 to CHP3n are connected to the LIOP2, and also the LIOP3 is assigned to the LPAR3 and CHP40 to CHP4n are connected to the LIOP3.

That is, in FIG. 3, the LPAR1 is a virtual computer comprising two logical central processing units (LIP11 and LIP12), one logical memory device (LMS1), one logical input/output processing unit (LIOP1) belonging to the IOPA being the first real input/output processing unit and a plurality of channel paths (CHP30 to CHP3n) connected to the LIOP1, and the LPAR2 is a virtual computer comprising two logical processing units (LIP21 and LIP22), one logical memory device (LMS2), one logical input/output processing unit (LIOP2) belonging to the IOPA being the first real input/output processing unit and a plurality of channel paths.(CHP3n+1 to CHP3n) connected to the LIOP2, and also the LPAR3 is a virtual computer comprising two logical central processing units (LIP31 and LIP32), one logical memory device (LMS3), one logical input/output processing unit (LIOP3) belonging to the IOPB being the second real input/output processing unit and a plurality of channel paths (CHP40 to CHP4n) connected to the LIOP3.

Next, using FIG. 4, the number of channel paths will be described when two real input/output processing units provided with the maximum input/output channel number defined by the hardware architecture are logically divided by a plurality of LPARs. In FIG. 4, the IOPA is provided with 256 channel paths being the maximum input/output channel number defined by the hardware architecture, and the channel paths belonging to the IOPA are logically divided into LPAR1 and LPAR2 and assigned in correspondence to the LPAR1 and the LPAR2 fixedly. That is, the channel path number of the CHP30 to CHP3n assigned fixedly to the LPAR1 and CHP3n+1 to CHP3n assigned fixedly to the LPAR2 is 256.

Also the IOPB is provided with 256 channel paths being the maximum input/output channel number defined by the hardware architecture, and the channel paths belonging to the IOPB are logically divided into LPAR3 and assigned in correspondence to the LPAR3 fixedly. That is, the channel path number of CHP40 to CHP4m assigned fixedly to the LPAR3 is 256. Consequently, LPAR1, LPAR2 and LPAR3 are assigned respectively in correspondence with the IOPA and the IOPB fixedly, thereby the 512 channel paths beyond the 256 channel paths being the maximum input/output channel number defined by the hardware architecture can be used.

Next using FIG. 5, in the prior art, procedure and configuration will be described where one real input/output processing unit is selected among a plurality of real input/output processing units constituting an input/output channel from an region ID and a channel path ID and the input/output operation is executed. In FIG. 5, a region ID is inputted from a signal line 4A0 which is connected to a latch A 410, and a channel path ID is inputted from a signal line 4A1 which is also connected to the latch A 410. The latch A 410 is a repeating latch where the signal line 4A0 and the signal line 4A1 are made inputs and the region ID sent through the signal line 4A0 and the channel path ID sent through the signal line 4A1 are once stored. The latch A 410 is connected through a signal line 4A2 and a signal line 4A3 to a selector A 420 and a plurality of real input/output processing units such as a real input/output processing unit 0 450, a real input/output processing unit 1 451 and a real input/output processing unit N 453.

The selector A 420 is a selector which inputs the region ID being output of the latch A 410 and sent through the signal line 4A2 and selects one input/output processing unit number storage entry among a plurality of input/output processing unit number storage entries constituting an input/output processing unit number storage list 430. The selector A 420 is further connected through a signal line 4A4 to the input/output processing unit number storage list 430.

The input/output processing unit number storage list 430 is constituted by a plurality of input/output processing unit number storage entries. One input/output processing unit number storage entry is selected among a plurality of input/output processing unit number storage entries constituting the input/output processing unit storage list 430 according to a real input/output processing unit selection command signal sent through the signal line 4A4, and content of the selected input/output processing unit number storage entry is sent through a signal line 4A5 to a latch B 440.

The latch B 440 is a repeating latch where content of the input/output processing unit number storage entry selected among a plurality of input/output processing unit number storage entries of the input/output processing unit number storage list 430 sent through the signal line 4A5 is once stored, and the latch B 440 is connected through a signal line 4A6 to group of a plurality of real input/output processing units such as a real input/output processing unit 0 450, a real input/output processing unit 1 451 and a real input/output processing unit N 453.

The channel path ID inputted to the real input/output processing unit is sent to a plurality of input/output processing units such as the real input/output processing unit 1 451 and the real input/output processing unit N 453 respectively connected through a signal line 4A3. A response signal from the real input/output processing unit and information attendant thereon are sent through a signal line 4A8 connected to a plurality of real input/output processing units such as the real input/output processing unit 0 450, the real input/output processing unit 1 451 and the real input/output processing unit N 453.

In the prior art, configuration of a real input/output processing unit and a selecting device has been described when one real input/output processing unit is selected among a plurality of real input/output processing units constituting an input/output channel from an region ID and a channel path ID and the input/output operation is executed. Next, in the prior art, content of input/output processing unit number storage entries constituting an input/output processing unit number storage list 430 will be described. Respective input/output processing unit number storage entries of the input/output processing unit number storage list 430 are constituted by real input/output processing unit number field. If the input/output processing unit number storage entry is selected, content of the real input/output processing unit number field within the input/output processing unit number storage entry of the input/output processing unit number storage list 430 is sent through the signal line 4A5 to the latch B 440.

The input/output processing unit number storage entry of the input/output processing unit number storage list 430 is provided with one entry in every region ID, and the number is determined by the number of the region ID which can be defined. For example, if the number of the region ID to be defined is 10, the input/output processing unit number storage entries are constituted by 10 or more in number.

In the prior art, configuration has been described where one real input/output processing unit is selected among a plurality of real input/output processing units constituting an input/output channel from an region ID and a channel path ID and the input/output operation is executed. Details of the selection process of the real input/output processing unit will be described using FIG. 5 as follows.

In FIG. 5, if the input/output operation from the PIP accompanied by the region ID and the channel ID is issued, the region ID and the channel path ID are inputted through the signal line 4A0 and the signal line 4A1 to the latch A 410. The latch A 410 is a repeating latch where the signal line 4A0 and the signal line 4A1 are made inputs and the prescribed region ID and the channel path ID sent through the signal line 4A0 and the signal line 4A1 are once stored, and the region ID latched in the latch A 410 is sent through the signal line 4A2 to the selector A 420. At the same time, the channel path ID latched in the latch A 410 is sent through the signal line 4A3 to a plurality of real input/output processing units such as the real input/output processing unit 0 450, the real input/output processing unit 1 451 and the real input/output processing unit N 453.

The selector A 420 uses the value of the region ID sent through the signal line 4A2, and issues command of selecting one input/output processing unit number storage entry among a plurality of input/output processing unit number storage entries constituting the input/output processing unit number storage list 430 through the signal line 4A4 to the input/output processing unit number storage list 430. The input/output processing unit number storage list 430 uses the value sent through the signal line 4A4, and selects one corresponding input/output processing unit number storage entry and sends content of the input/output processing unit number storage entry through the signal line 4A5 to the latch B 440.

The latch B 440 latches the real input/output processing unit number being the content of the selected input/output processing unit number storage entry among a plurality of input/output processing unit number storage entries of the input/output processing unit number storage list 430 sent through the signal line 4A5. The real input/output processing unit number latched to the latch B 440 is sent through the signal line 4A6 to a group of a plurality of real input/output processing units such as the real input/output processing unit 0 450, the real input/output processing unit 1 451 and the real input/output processing unit N 453. The real input/output processing unit number sent through the signal line 4A6 is received by a plurality of real input/output processing units in the group, and only one real input/output processing unit supplied with the same number as the real input/output processing unit number is allowed to execute the input/output operation. The one real input/output processing unit fetches the channel path ID sent through the signal line 4A3, applies the starting to the channel path assigned in the channel path ID and executes the input/output operation action.

Access from the real input/output processing unit to the virtual computer attendant on the input/output operation action in the selected channel path within the real input/output processing unit sends the real input/output processing unit number and the channel path ID to the signal line 4A7 and the signal line 4A8 respectively, and the real input/output processing unit number and the channel path ID are inputted to an region ID determination logic 460. The region ID determination logic 460 specifies the region ID from the real input/output processing unit number and the channel path ID sent through the signal line 4A7 and the signal line 4A8, and sends the channel path ID and other access information to the corresponding virtual computer.

As above described, in the prior art, in a real information processing unit in such a procedure and configuration that an input/output processing unit number storage entry is selected based on a region ID and a channel path ID, and one real input/output processing unit is selected among a plurality of real input/output processing units constituting an input/output channel according to a real input/output processing unit number being the content of the selected input/output processing unit number storage entry, and the input/output operation is executed, the channel paths with the number beyond the maximum input/output channel number defined by the hardware architecture can be used. However, correspondence of each LPAR and the real input/output processing unit to be assigned is fixed. Consequently, channel paths of a plurality of real input/output processing units cannot be assigned dynamically to one LPAR.

The limitation that the correspondence of each LPAR and the real input/output processing unit to be assigned is fixed and channel paths of a plurality of real input/output processing units cannot be assigned dynamically to one LPAR means that more channel paths cannot be assigned dynamically to the LPAR when the input/output load increases due to variations with time of input/output loads of OS acting on a plurality of LPARs respectively. As a result, a problem is produced in that the performance of an individual OS acting on a plurality of LPARs suffers. This problem is a serious problem which cannot be disregarded in maintaining and improving securing the performance of the virtual computer system.

Apparatus has been proposed to address the maximum input/output channel number defined by the hardware architecture of the real information processing unit wherein the data width to assign the channel path ID is widened thereby the maximum number of the channel path ID to be assigned is increased. As a result, the total input/output channel number to be assigned to a plurality of LPARs is increased. This apparatus has a defect that the hardware architecture of the real information processing unit must be changed and the program acting on the hardware architecture of the real information processing unit before the changing does not act the same when the change is made. This involves a serious problem from the viewpoint of the compatibility of the program.

Further in order to widen the data width to assign the channel path ID defined by the hardware architecture of the real information processing unit, a signal line to transfer the channel path ID must be added and the hardware logic of the channel path selection control must be changed. As a result, the enormous hardware logic must be changed and added, and an industrial problem in manufacturing industrial products exists in that the cost for development and manufacture of the information processing units is significantly increased. Also this industrial problem is a serious problem which cannot be disregarded.

SUMMARY OF THE INVENTION

The object of the present invention is to provide a method and apparatus for extending the input/output channel of an information processing unit such that the compatibility of the program acting on the LPAR is maintained without changing the hardware architecture to assign the channel path of the real information processing unit.

Another object of the present invention is to provide a method and apparatus for extending the input/output channel of an information processing unit such that a rapid increase of the hardware logic of the information processing unit is suppressed without adding to the data width of the channel path ID defined by the hardware architecture to assign the channel path of the real information processing unit.

Yet another object of the present invention is to provide a method and apparatus for extending the input/output channel of an information processing unit such that an extending system attendant on the logical dividing of the input/output channel suppresses the industrial cost and further has flexibility for the extensibility of the system.

In order to attain the foregoing objects, the present invention provides an extending system of an input/output channel in an information processing unit including a central processing unit, a memory device, an input/output channel and a plurality of virtual computers acting on the central processing unit. The input/output channel includes a plurality of input/output processing units and a plurality of input/output channel paths connected to the input/output processing units. Each of the virtual computers issues a region ID which identifies the virtual computer and a channel path ID which identifies an input/output channel path and accesses the input/output channel via an input/output processing unit. A channel path reconfiguration array is provided having a plurality of channel path reconfiguration array blocks corresponding to region IDs. Each channel path reconfiguration array block comprises a plurality of channel path reconfiguration array entries corresponding to channel path IDs. Each channel path reconfiguration array entry has stored therein an input/output processing unit number and a channel path ID.

A selector is provided for selecting a channel path reconfiguration array block within the channel path reconfiguration array corresponding to a region ID issued from the virtual computer and selecting a channel path reconfiguration array entry within the channel path reconfiguration array block corresponding to the channel path ID issued from the virtual computer. When the demand of the input/output operation is issued from the virtual computer and the region ID and the channel path ID are issued, the channel path reconfiguration array block within the channel path reconfiguration array corresponding to the region ID is selected by the selector and the channel path reconfiguration array entry corresponding to the channel path ID is selected from the channel path reconfiguration array block. The stored real input/output processing unit number and the channel path ID are read out from the selected channel path reconfiguration array entry and a real input/output processing unit corresponding to the read-out real input/output processing unit number is selected. The input/output channel path corresponding to this read-out channel path ID used to start the input/output operation is assigned to the selected real input/output processing unit.

When a changing demand of the content of the channel path reconfiguration array is issued from the virtual computer and the region ID and the channel path ID are issued, a real input/output processing unit number and a channel path ID are stored in a selected channel path reconfiguration array entry. The selector selects the channel path reconfiguration array block within the channel path reconfiguration array corresponding to the region ID and selects the channel path reconfiguration array entry within the channel path reconfiguration array block corresponding to the channel path ID. The issued real input/output processing unit number and the channel path ID are written into the selected channel path reconfiguration array entry, thereby changing the content of the selected channel path reconfiguration array entry.

Also each channel path reconfiguration array entry includes a validity display field indicating whether the channel path reconfiguration array entry is valid or invalid, a real input/output processing unit number field storing a real input/output processing unit number, and a channel path ID field storing a channel path ID for assigning an input/output channel path to the real input/output processing unit corresponding to the real input/output processing unit number. When the channel path reconfiguration array entry is selected and read out by input/output operation demand from the virtual computer and the validity display field of the read-out channel path reconfiguration array entry indicates invalidity, a condition code indicating that the input/output channel path corresponding to the channel path ID issued with the demand is not available is reported to the virtual computer. Further, when the validity display field indicates validity, an input/output processing unit is selected using the input/output processing unit number of the input/output processing unit number field and access is conducted to the selected input/output processing unit using the input/output channel path identified by the channel path ID read out from the channel path ID field.

The content of the validity display field of the channel path reconfiguration array entry selected by a changing demand from a virtual computer can be changed by validity display field information. The input/output processing unit number field information and the channel path ID field information can also be issued to change the contents of corresponding fields of the channel path reconfiguration array.

Also when the changing demand of the content of the channel path reconfiguration array is issued from the virtual computer and only the validity display field information is issued, only the validity display field of the selected channel path reconfiguration array entry is changed. When only the input/output processing unit number field information is issued along with a changing demand, only the input/output processing unit number field of the selected channel path reconfiguration array entry is changed. When only the channel path ID field information is issued along with a changing demand, only the channel path ID field of the selected channel path reconfiguration array entry is changed. When the changing demand of content of the channel path reconfiguration array is issued from the virtual computer and only the validity display field information and the input/output processing unit number field information are provided, only the validity display field of the selected channel path reconfiguration array entry and the input/output processing unit number field are changed. When only the input/output processing unit number field information and the channel path ID field information are issued along with the demand, only the input/output processing unit number field of the selected channel path reconfiguration array entry and the channel path ID field are changed. Also when only the channel path ID field information and the validity display field information are issued along with the demand, only the channel path ID field of the selected channel path reconfiguration array entry and the validity display field are changed.

The input/output processing units, responsive to an input/output demand from a virtual computer, performs the input/output operation asynchronously relative to other operations being performed by the information processing system which executes the operations of the virtual computer. Thus, upon completion of an input/output operation by one of the input/output processing units the virtual computer to which the results of the operation are to be directed must be identified. Once the virtual computer is identified an interrupt is applied to the identified computer.

The extending system of the present invention accomplishes the above by providing a region ID reconfiguration array having a plurality of region ID reconfiguration array blocks corresponding to input/output processing unit numbers. Each region ID configuration block includes a plurality of region ID reconfiguration array entries corresponding to channel path IDs and each region ID reconfiguration array entry includes a region ID and a channel path ID. A second selector is provided for selecting a region ID reconfiguration array block within the region ID reconfiguration array corresponding to an input/output processing unit number issued as a response to an access by an input/output processing unit and selecting a region ID reconfiguration array entry from the selected region ID reconfiguration array block corresponding to the channel ID issued as a response to the access by the input/output processing unit. The input/output processing unit corresponding to the input/output processing unit number issues a response to a virtual computer corresponding to the region ID from the selected region ID reconfiguration array entry.

When a changing demand of the contents of region ID reconfiguration array is issued from the virtual computer along with an input/output processing unit number and channel path ID, a region ID and a channel path ID are stored in a region ID reconfiguration array entry of a region ID reconfiguration array block within the region ID reconfiguration array selected by the second selector based on the input/output processing unit number and the channel path ID issued by said virtual computer.

Each region ID reconfiguration array entry includes a validity display field indicating whether the region ID reconfiguration array entry is valid or invalid, a region ID field storing a region ID and a channel path ID field storing a channel path ID.

When the validity display field of a selected region ID reconfiguration array entry indicates invalidity, a condition code that an input/output channel path corresponding to the channel path ID associated with the access is not available is reported. When the validity display field indicates validity, a virtual computer corresponding to the region ID of the region ID field is selected and response is conducted to the selected virtual computer by an input/output processing unit associated with the access.

According to the above, respective channel path reconfiguration array blocks corresponding to the region ID of the identifier of the virtual computer are provided with the channel path reconfiguration array entries corresponding to the maximum input/output channel path number defined by the hardware architecture of the real information processing unit. Thus, a plurality of LPARs respectively can use the input/output channel of the maximum number defined by the hardware architecture of the real information processing unit. Also content of the respective channel path reconfiguration array entries is provided with an input/output processing unit number field and a channel path ID field, thereby the input/output channel paths of a plurality of real input/output processing units can be assigned to one LPAR arbitrarily.

As a result, without changing the hardware architecture of the real information processing unit constituting the input/output channel, in the information processing unit as a whole, the function of accessing the input/output channel paths with a number beyond the maximum input/output channel path number defined by the basic hardware architecture of the information processing unit can be realized. Further, any real input/output processing unit among a plurality of real input/output processing units can be in correspondence to the input/output channel corresponding to a channel path ID from the LPARs. Further, any one input/output channel path within the input/output processing unit can be in correspondence to the input/output processing units.

Further, the compatibility of the program acting on the LPAR is maintained and the adding of the data width of the channel path ID defined by the hardware architecture of the information processing unit is made unnecessary. Thus, a method and apparatus of extending an input/output channel which suppresses the rapid increase of the hardware logic of the information processing unit can be realized. Further, an extending system of an input/output channel is provided where the industrial cost is suppressed, the extensibility of the system is more flexible and the performance of respective virtual computers is improved.

BRIEF DESCRIPTION OF THE DRAWINGS

The present invention will be more apparent from the following detailed description, when taken in conjunction with the accompanying drawings, in which:

FIG. 4 is a table explaining an extending method of an input/output channel in the prior art;

FIG. 6 is a block diagram illustrating a detailed example of hardware of an input/output channel selection mechanism using a channel path reconfiguration array and an region ID reconfiguration array as an embodiment of the invention;

DETAILED DESCRIPTION OF THE PREFERRED EMBODIMENTS

Figure 1:
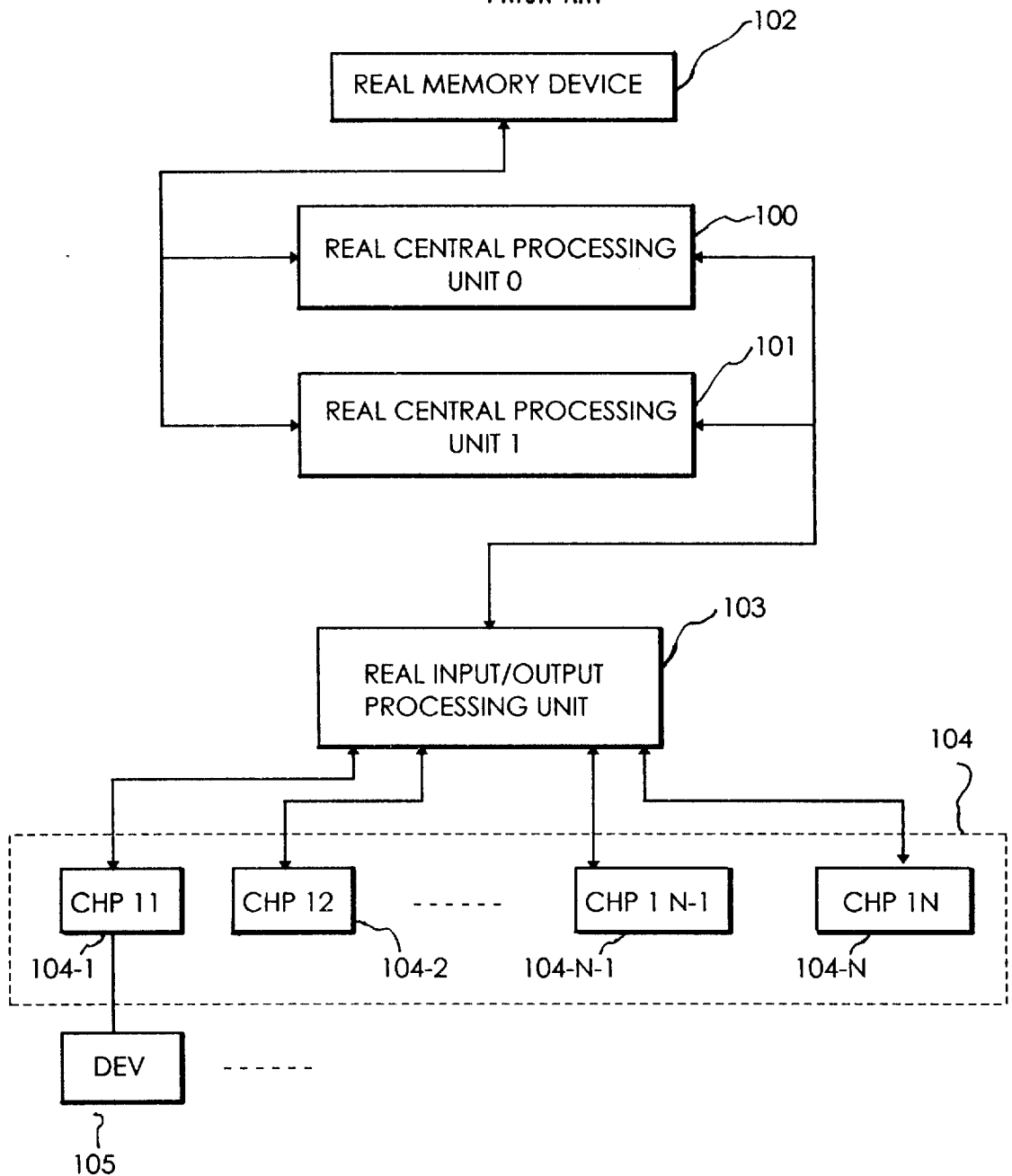
FIG. 1 is a block diagram illustrating the concept of configuration of a real computer in the prior art.
Figure 2:
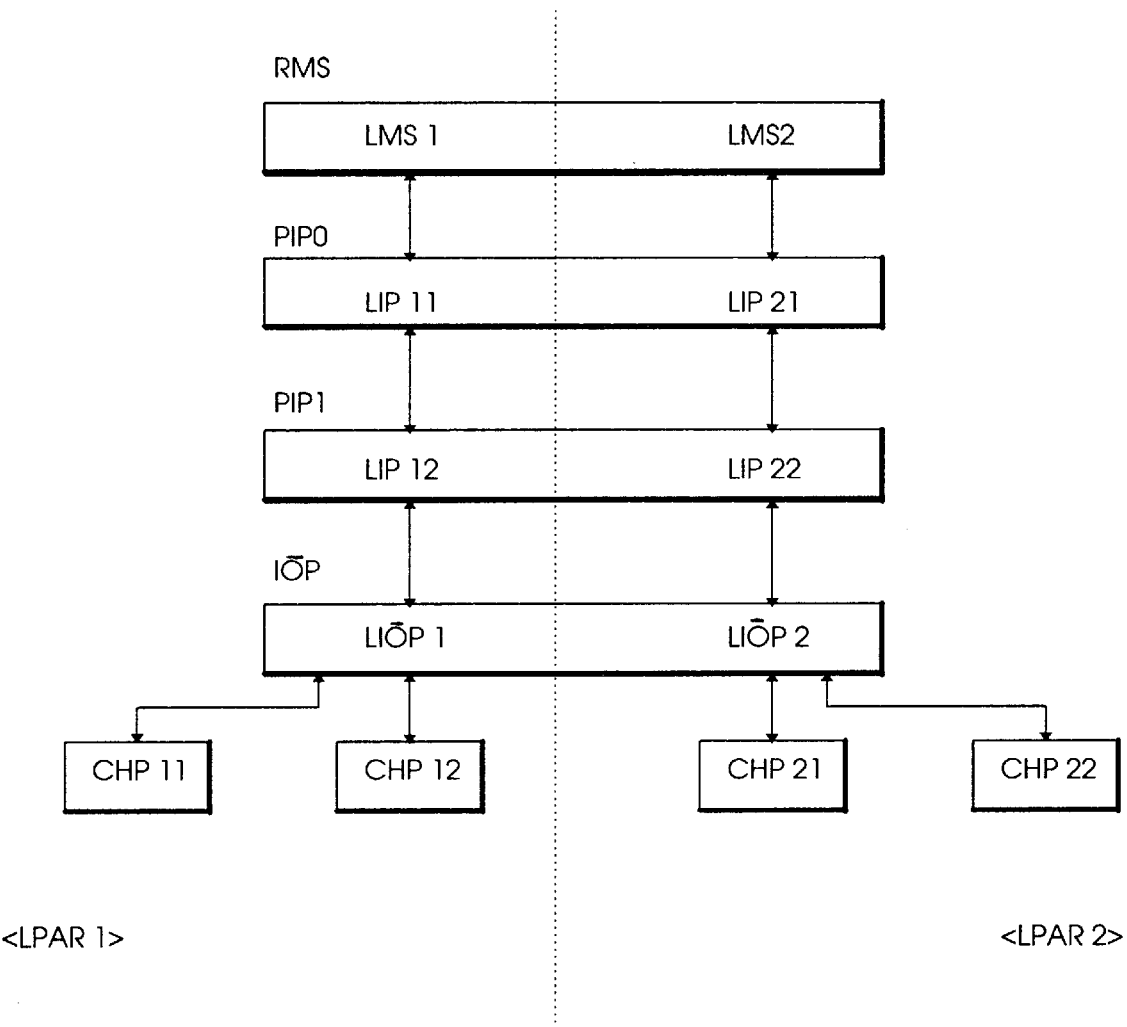
FIG. 2 is a block diagram illustrating concept of common use of a real computer to a virtual computer in the prior art
Figure 3:
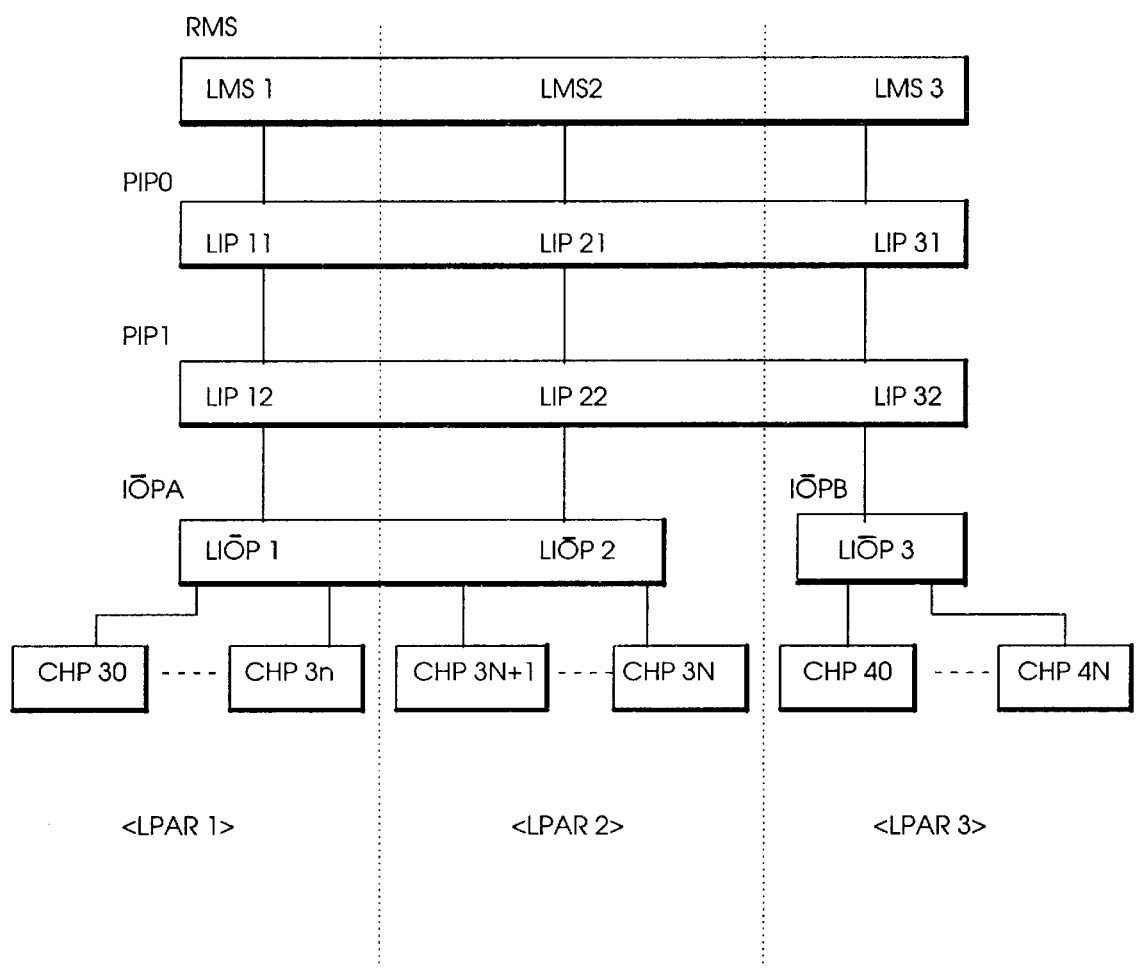
FIG. 3 is a block diagram illustrating concept of configuration and correspondence of a plurality of virtual computers acting on a real computer and distribution of hardware resources used by respective virtual computers in the prior art.
Figure 5:
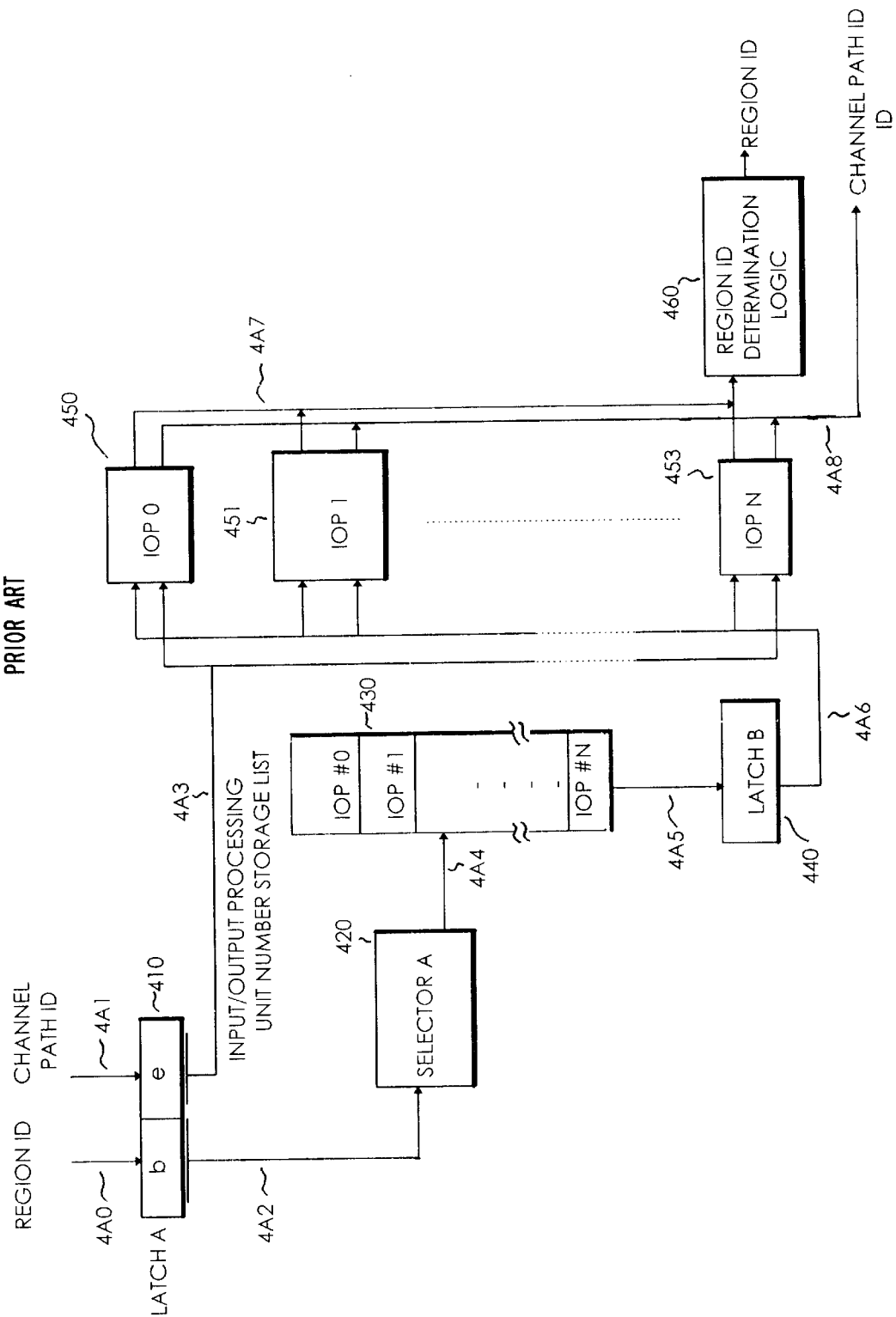
FIG. 5 is a block diagram showing a detailed example of hardware of an input/output channel selection mechanism using IOP number storage list in the prior art.

Embodiments of an extending system of an input/output channel according to the present invention will be described in detail using the accompanying drawings as follows.

FIG. 6 is a logic block diagram showing details of hardware of a selecting device of a real input/output processing unit as an embodiment of the present invention where using a channel path reconfiguration array from a region ID and a channel path ID, one real input/output processing unit is selected among a plurality of real input/output processing units constituting an input/output channel and the input/output operation is executed. In FIG. 6, the input/output operation demand from one virtual computer (LPAR) is issued accompanied by an region ID which identifies the LPAR and a channel path ID which identifies an input/output channel path.

The region ID is inputted from a signal line 6A1, and the channel path ID is inputted from a signal line 6A2. The signal line 6A1 and the signal line 6A2 are connected to a latch A 610. The latch A 610 is a repeating latch where the signal line 6A1 and the signal line 6A2 are made inputs and the region ID corresponding to the LPAR and the channel path ID assigned to the LPAR sent through the signal line 6A1 and the signal line 6A2 are once stored, and the latch A 610 is connected through a signal line 6A4 and a signal line 6A5 to a selector A 620.

The selector A 620 is a selector which inputs the region ID corresponding to the LPAR and the channel path ID of the LPAR being outputs of the latch A 610 sent through the signal line 6A4 and the signal line 6A5, and selects one channel path reconfiguration array block among a plurality of channel path reconfiguration array blocks constituting a channel path reconfiguration array 630, and further selects one channel path reconfiguration array entry among a plurality of channel path reconfiguration array entries constituting the channel path reconfiguration array block. The selector A 620 is further connected through a signal line 6A6 to the channel path reconfiguration array 630.

The channel path reconfiguration array 630 is constituted by a plurality of the channel path reconfiguration array blocks, and one channel path reconfiguration array block is constituted by a plurality of the channel path reconfiguration array entries.

The channel path reconfiguration array 630 permits selection by the selector A620 of one channel path reconfiguration array block among a plurality of channel path reconfiguration array blocks constituting the channel path reconfiguration array 630 by a block selection command signal and an entry selecting signal sent through the signal line 6A6, and further selects one channel path reconfiguration array entry within the block. The channel path reconfiguration array 630 sends content of the selected channel path reconfiguration array entry within the selected channel path reconfiguration array block through a signal line 6A7 to a latch B 640. The channel path reconfiguration array 630 is further connected to a signal line 6A3 which inputs writing data to the channel path reconfiguration array entry within the selected channel path reconfiguration array block so as to change the contents of a selected channel path reconfiguration array entry in response to a change demand from a virtual computer.

The latch B 640 is a repeating latch where content of one channel path reconfiguration array entry selected from one channel path reconfiguration array block selected among a plurality of channel path reconfiguration array blocks within the channel path reconfiguration array 630 sent through the signal line 6A7 is once stored. The latch B 640 is connected through a signal line 6A8 to a plurality of real input/output processing units such as a real input/output processing unit 0 650, a real input/output processing unit 1 651, a real input/output processing unit 2 652 and a real input/output processing unit N 653.

An input/output operation command signal to an input/output channel is inputted through the signal line 6A8 to a plurality of real input/output processing units such as the real input/output processing unit 0 650, the real input/output processing unit 1 651, the real input/output processing unit 2 652 and the real input/output processing unit N 653 respectively.

The input/output operations performed by the input/output processing units are performed asynchronously relative to other operations performed by the system. Thus, upon completion of an input/output operation by an input/output processing unit response information is to be sent to a virtual computer to which the input/output operation is to be directed.

The response information from an input/output channel to a virtual computer is sent through a signal line 6AA connected to a plurality of real input/output processing units such as the real input/output processing unit 0 650, the real input/output processing unit 1 651, the real input/output processing unit 2 652 and the real input/output processing unit N 653 respectively.

The selector B 660 is a selector which inputs the number of a real input/output processing unit and a channel path ID of an input/output channel being a response origin, as response information from the input/output channel to the virtual computer. The response information are outputs of one real input/output processing unit among a plurality of real input/output processing units such as the real input/output processing unit 0 650, the real input/output processing unit 1 651, the real input/output processing unit 2 652 and the real input/output processing unit N 653 that are sent through the signal line 6AA. The response information causes the selector B 660 to select one region ID reconfiguration array block among a plurality of region ID reconfiguration array blocks constituting a region ID reconfiguration array 670, and select one region ID reconfiguration array entry among a plurality of region ID reconfiguration array entries within the region ID reconfiguration array block.

The selector B 660 is connected also through a signal line 6AB to the region ID reconfiguration array 670. The selector B 660 is further connected to a latch D 690. The latch D 690 is a repeating latch where a signal line 6B1 and a signal line 6B2 are made inputs and data sent through the signal line 6B1 and the signal line 6B2 and to be written in the region ID reconfiguration array 670 are once stored, and the latch D 690 is connected through a signal line 6B4 and a signal line 6B5 to the selector B 660.

The region ID reconfiguration array 670 is constituted by a plurality of region ID reconfiguration array blocks. Each region ID reconfiguration array block is constituted by a plurality of region ID reconfiguration array entries. The region ID reconfiguration array 670 permits selection by the selector B 660 of one region ID reconfiguration array block among a plurality of region ID reconfiguration array blocks constituting the region ID reconfiguration array 670 by a block selection command signal sent through the signal line 6AB, and further permits selection by the selector B 660 of one region ID reconfiguration array entry within the block. The region ID reconfiguration array 670 sends the content of the selected region ID reconfiguration array entry within the selected region ID reconfiguration array block through a signal line 6AC to a latch C 680.

The region ID reconfiguration array 670 is further connected to a signal line 6AE which inputs data to be written into the region ID reconfiguration array entry within the selected region ID reconfiguration array block so as to change the contents of a selected region ID reconfiguration array entry in response to a change demand from a virtual computer.

The latch C 680 is a repeating latch where the contents of the selected region ID reconfiguration array entry within the selected region ID reconfiguration array block of the region ID reconfiguration array 670 sent through the signal line 6AC is once stored. The latch C 680 is also connected through a signal line 6AD to a real information processing unit which controls a virtual computer.

Logic configuration showing an embodiment of hardware has been described above in detail where one real input/output processing unit is selected among a plurality of real input/output processing units constituting an input/output channel and the input/output operation is conducted using a channel path reconfiguration array based on a region ID and a channel path ID.

Further, described above in detail is where one virtual computer is selected and response information is provided to the selected virtual computer using a region ID reconfiguration array based on an input/output processing unit number and a channel path ID.

Next, using FIG. 6 and FIGS. 7A–7B, details of logic configuration of the channel path reconfiguration array 630 and the region ID reconfiguration array 670 will be described.

Figure 7A:
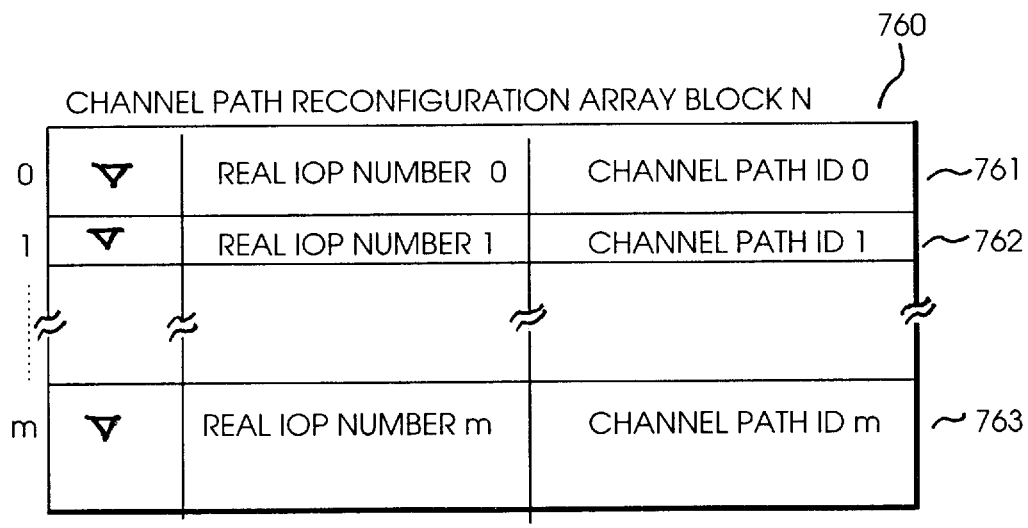
FIGS. 7A–7B are diagrams illustrating detailed configuration within a channel path reconfiguration array block and a region ID reconfiguration array block constituting the channel path reconfiguration array and the region ID reconfiguration array shown in FIG. 6.
Figure 7B:
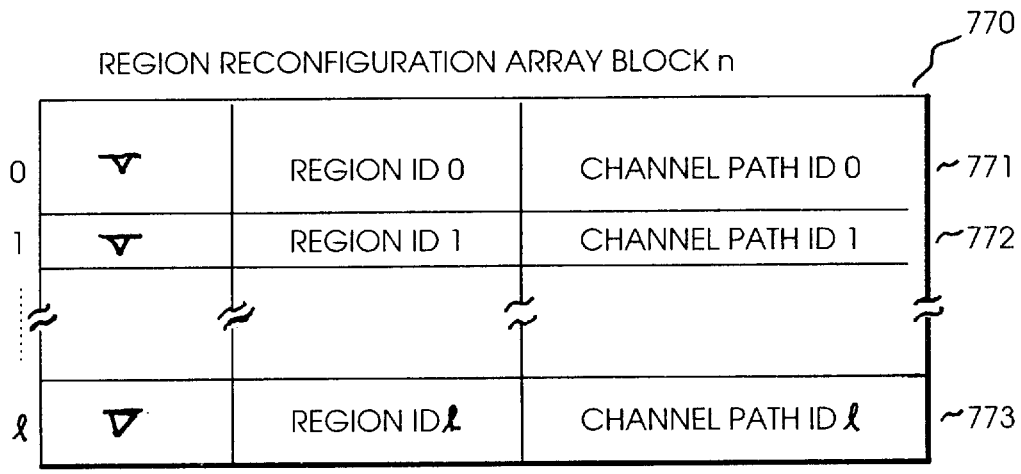

In FIG. 6 and FIGS. 7A–7B, the channel path reconfiguration array 630 is constituted by a plurality of channel path reconfiguration array blocks. One channel path reconfiguration array block 760 among a plurality of channel path reconfiguration blocks constituting the channel path reconfiguration array 630 is selected by a channel path reconfiguration array block selection command signal sent through the signal line 6A6. Further, each channel path reconfiguration array block 760 is constituted by a plurality of channel path reconfiguration array entries from a channel path reconfiguration array entry 0 761 to a channel path reconfiguration array entry m 763.

One channel path reconfiguration array entry is selected among a plurality of channel path reconfiguration array entries from a channel path reconfiguration array entry 0 761 to a channel path reconfiguration array entry m 763 constituting one channel path reconfiguration array block 760 by an entry selection command signal sent through the signal line 6A6, and the selected array entry is sent through the signal line 6A7 to the latch B 640. Respective channel path reconfiguration array entries are constituted by three fields, V field indicating whether the channel path reconfiguration array entry is valid or invalid, real input/output processing unit number field and channel path ID field.

In the latch B 640, it is tested whether the channel path reconfiguration array entry is valid or invalid. If the entry is valid, the entry is latched and content of the real input/output processing unit number field and the channel path ID field within the channel path reconfiguration array entry of the channel path reconfiguration array block 760 of the channel path reconfiguration array 630 is sent through the signal line 6A8 to the real input/output processing unit group. The real input/output processing unit is selected by the real input/output processing unit number of the real input/output processing unit number field, and the input/output operation is started to the selected real input/output processing unit using the channel path ID read out from the channel path ID field. If the channel path reconfiguration array entry is invalid, the condition code that the input/output channel path corresponding to the channel path ID issued along with the access demand of the input/output channel is not available is reported to the virtual computer of the demand origin, and execution of the demanded input/output operation is finished.

Before the channel path reconfiguration array entry is sent to the latch B 640, a decision is effected regarding whether the channel path reconfiguration array entry is valid or invalid. Only when the channel path reconfiguration array entry is valid, the channel path reconfiguration array entry is sent to the latch B 640. When it is invalid, the condition code that the input/output channel path corresponding to the channel path ID issued along with the access demand of the input/output channel is not available is reported to the virtual computer in the demand origin.

Regarding the channel path reconfiguration array entry of the channel path reconfiguration array block 760 of the channel path reconfiguration array 630, in this example, one entry is provided in every channel path ID and the 256 channel path reconfiguration array entries in every one block are constituted. In other words, the channel path ID is provided with entries of up to 256 in number. For example, this number is also the maximum number of the channel path IDs defined by the hardware architecture of the real information processing unit.

The channel path reconfiguration array 630 is further connected to the signal line 6A3 which inputs data to be written into the channel path reconfiguration array entry within the selected channel path reconfiguration array block 760. Any data can be stored in respective channel path reconfiguration array entries of respective channel path reconfiguration array block 760 constituting the channel path reconfiguration array 630.

Next, the region ID reconfiguration array 670 will be described. In FIG. 6 and FIGS. 7A–7B, the region ID reconfiguration array 670 is constituted by a plurality of region ID reconfiguration array blocks. A region ID reconfiguration array block 770 is selected among a plurality of region ID reconfiguration array blocks constituting the region ID reconfiguration array 670, according to the region ID reconfiguration array block selection command which includes an parameters of the real input/output processing unit number sent through the signal line 6AB.

Each region ID reconfiguration array block 770 is constituted by a plurality of region ID reconfiguration array entries from an region ID reconfiguration array entry 0 771 to an region ID reconfiguration array entry m 773. One region ID reconfiguration array entry is selected from a plurality of region ID reconfiguration array entries from the region ID reconfiguration array entry 0 771 to the region ID reconfiguration array entry m 773, according to an entry selection command signal sent through the signal line 6AB. Respective region ID reconfiguration array entries are constituted by the three fields, the V field indicating whether the region ID reconfiguration array entry is valid or invalid, the region ID field and the channel path ID field.

In the latch C 680, it is tested whether the region ID reconfiguration array entry is valid or invalid. If the entry is valid, the entry is latched and the content of the region ID field and the channel path ID field within the region ID reconfiguration array entry of the region ID reconfiguration array block 770 of the region ID reconfiguration array 670 is sent through the signal line 6AD to the real information processing unit which controls the virtual computer. If the region ID reconfiguration array entry is invalid, the condition code that the input/output channel path corresponding to the channel path ID issued along with on the access demand of the input/output channel is not available is reported to the real input/output processing unit in the response origin, and the demanded response operation is finished.

Before the region ID reconfiguration array entry is sent to the latch C 680A, decision is made regarding whether the region ID reconfiguration array entry is valid or invalid. Only when the region ID reconfiguration array entry is valid, the region ID reconfiguration array entry is sent to the latch C 680. When it is invalid, the condition code that the input/output channel path corresponding to the channel path ID is issued along with the access demand of the input/output channel is not available is reported to the real input/output processing unit in the response origin.

Regarding the region ID reconfiguration array entry of the region ID reconfiguration array block 770 of the region ID reconfiguration array 670, in this example, one entry is provided in every channel path ID and the 256 region ID reconfiguration array entries are constituted in every one block. In other words, the channel path ID is provided with entries up to 256 in number. For example, this number is also the maximum number of channel path IDs defined by the hardware architecture of the real information processing unit.

The region ID reconfiguration array 670 is further connected to the signal line 6AE which inputs data to be written into the region ID reconfiguration array entry within the selected region ID reconfiguration array block 770. Any data can be stored within any respective region ID reconfiguration array entries of the respective region ID reconfiguration array blocks 770 constituting the region ID reconfiguration array 670.

A detailed embodiment has been described regarding hardware and a channel path ID reconfiguration array and a region ID reconfiguration array constituting its main part to be used in realizing a procedure that a channel path reconfiguration array is used based on a region ID and a channel path ID, and one real input/output processing unit is selected among a plurality of real input/output processing units constituting an input/output channel and the input/output operation is executed. Further, a procedure is realized that a region ID reconfiguration array is used from a real input/output processing unit number and a channel path ID, and one virtual computer is selected among a plurality of virtual computers constituting a virtual computer system, and responds to the input/output operation.

Details of procedure of selecting one real input/output procedure unit among a plurality of real input/output processing units will be described in detail using FIG. 6, FIGS. 7A–7B and FIG. 8 as follows.

Figure 8:
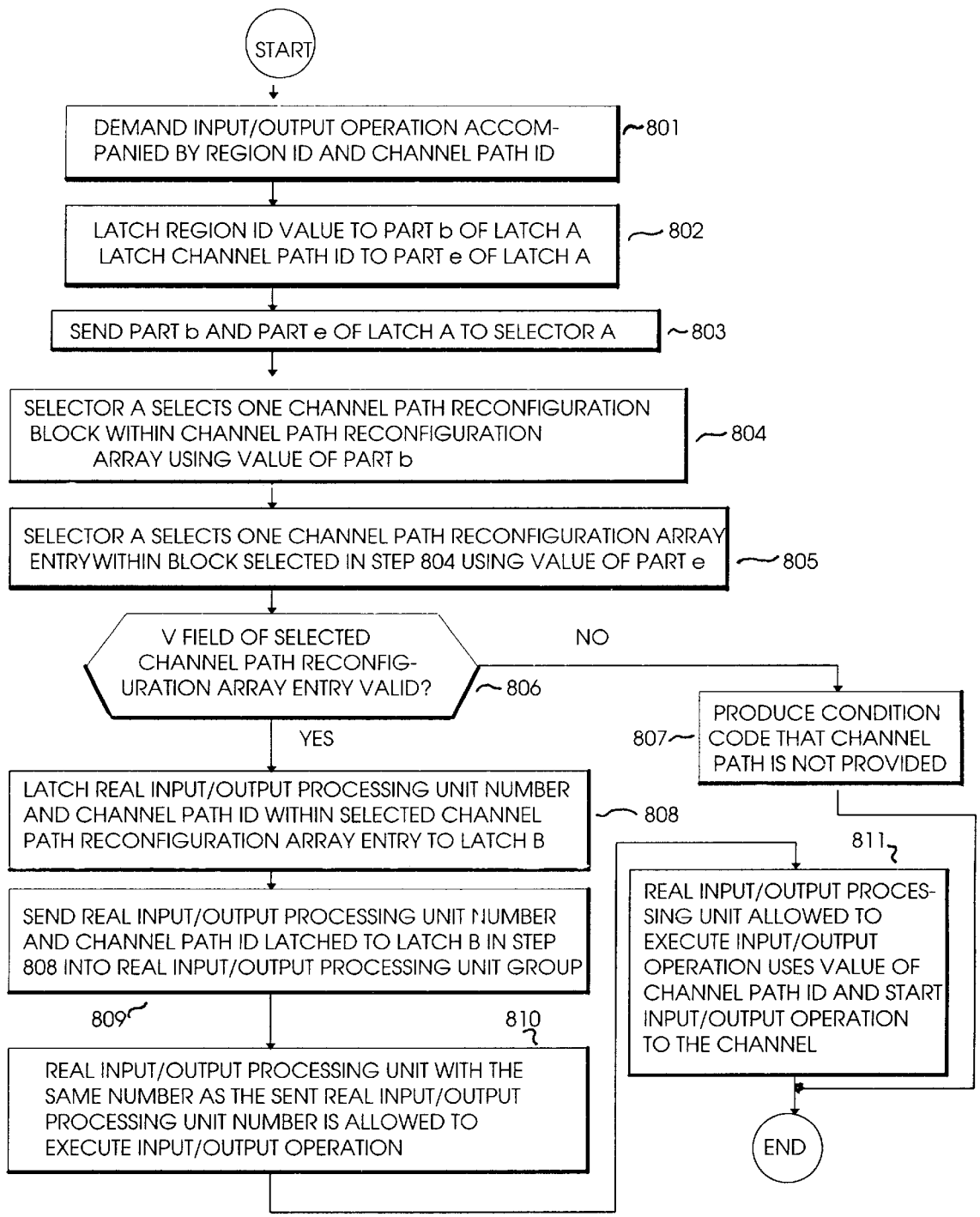
FIG. 8 is a flow chart of processing of selecting a real input/output processing unit and an input/output channel path using a region ID and a channel path ID.

In FIG. 8, procedure of using the channel path reconfiguration array from the region ID and the channel path ID, and selecting one real input/output processing unit among a plurality of real input/output processing units constituting an input/output channel and executing the input/output operation is constituted from step 801 to step 811. Procedure of conversion processing will be described in each step as follows.

Step 801: The input/output operation to an input/output channel assigned to LPAR is issued from LIP accompanied by a prescribed region ID and a channel path ID assigned to LPAR acting then. The prescribed region ID and the channel path ID are inputted respectively through a signal line 6A1 and through a signal line 6A2 to a latch A 610.

Then an input/output channel required by the LPAR is already divided and assigned to a channel path within a plurality of real input/output processing units constituting a real information processing unit. That is, respective channel path reconfiguration array entries of respective channel path reconfiguration array blocks 760 constituting a channel path reconfiguration array 630 corresponding to an region ID corresponding to the LPAR are already set to a real input/output processing unit number field and a channel path ID field in correspondence with an input/output channel path within a plurality of real input/output processing units constituting an input/output channel and a real information processing unit required by the LPAR.

Step 802: The prescribed region ID latched to part b of the latch A 610, and the channel path ID sent through the signal line 6A2 is latched to part e of the latch A 610.

Step 803: The latch A 610 is a latch where the signal line 6A1 and the signal line 6A2 are made inputs and the prescribed region ID and the channel path ID sent through the signal line 6A1 and the signal line 6A2 are once stored, and the latch A 610 sends value of the prescribed region ID latched to the part b of the latch A 610 and the channel path ID latched to the part e of the latch A 610 through a signal line 6A4 to a selector A 620.

Step 804: The selector A 620 uses value of the region ID sent through the signal line 6A4, and outputs a block selection command signal commanding that one channel path reconfiguration array block is selected among a plurality of channel path reconfiguration array blocks 760 constituting a channel path reconfiguration array 630 through a signal line 6A6 to the channel path reconfiguration array 630. The channel path reconfiguration array 630 uses value of the block selection command signal and the region ID sent through the signal line 6A6, and selects one corresponding channel path reconfiguration array block.

Step 805: The selector A 620 uses a value of the channel path ID sent through the signal line 6A4, and outputs an entry selection command signal commanding that one channel path reconfiguration array entry is selected among a plurality of channel path reconfiguration array entries within one channel path reconfiguration array block selected in step 804 through the signal line 6A6 to the channel path reconfiguration array 630. The channel path reconfiguration array 630 uses value of the entry selection command signal and the channel path ID sent through the signal line 6A6, and selects one channel path reconfiguration array entry among a plurality of channel path reconfiguration array entries within the channel path reconfiguration array block, and sends the content of the channel path reconfiguration array entry through a signal line 6A7 to a latch B 640.

Step 806: The latch B 640 latches content of one channel path reconfiguration array entry selected among a plurality of channel path reconfiguration array entries within one channel path reconfiguration array block selected among a plurality of channel path reconfiguration array blocks of the channel path reconfiguration array 630 sent through the signal line 6A7, and tests whether the V field of the channel path reconfiguration array entry is valid or invalid. If the V field of the channel path reconfiguration array entry indicates validity, the process is advanced to step 808. If the V field of the channel path reconfiguration array entry indicates invalidity, the process is advanced to step 807.

Step 807: This step is executed when the V field of the selected channel path reconfiguration array entry is invalid. The condition code indicating that an input/output channel corresponding to the channel path ID issued along with the access demand of the input/output channel is not assigned or not available is reported to a virtual computer in the demand origin, and execution of the demanded input/output operation is finished.

Step 808: This step is executed when the V field of the selected channel path reconfiguration array entry is valid. Content of the real input/output processing unit number field and the channel path ID field being content of one channel path reconfiguration array entry selected among a plurality of channel path reconfiguration array entries constituting the channel path reconfiguration array block 760 within the channel path reconfiguration array 630 sent through a signal line 6A7 is latched to a latch B 640.

Step 809: The real input/output processing unit number and the channel path ID latched to the latch B 640 in step 808 are sent through a signal line 6A8 to a plurality of real input/output processing units such as a real input/output processing unit 0 650, a real input/output processing unit 1 651, a real input/output processing unit 2 652 and a real input/output processing unit N 653.

Step 810: The real input/output processing unit number and the channel path ID sent through a signal line 6A8 are received by the real input/output processing unit 0 650, the real input/output processing unit 1 651, the real input/output processing unit 2 652, the real input/output processing unit N 653 and the like being a group of a plurality of real input/output processing units. Only one real input/output processing unit having the same number as the real input/output processing unit number is allowed to execute the input/output operation and changes to the executable state so as to execute the input/output operation.

Step 811: The real input/output processing unit allowable to execute the input/output operation in step 810 fetches the channel path ID part of the latch B 640 sent through the signal line 6A8 in step 809 as the channel path ID of the input/output channel path of the real input/output processing unit starting the input/output operation, and starts the input/output operation to the corresponding input/output channel path of the real input/output processing unit.

Details of an embodiment of a procedure have been described where a channel path reconfiguration array is used based on a region ID and a channel path ID, and one real Oinput/output processing unit is selected among a plurality of real input/output processing units constituting an input/output channel path, and the input/output operation is started.

Next, details of a procedure will be described using FIG. 6, FIGS. 7A–7B and FIG. 9 where in order to return a response upon completion of execution of the input/output operation from a real input/output processing unit to which the input/output operation is started, one virtual computer is selected among a plurality of virtual computers.

Figure 9:
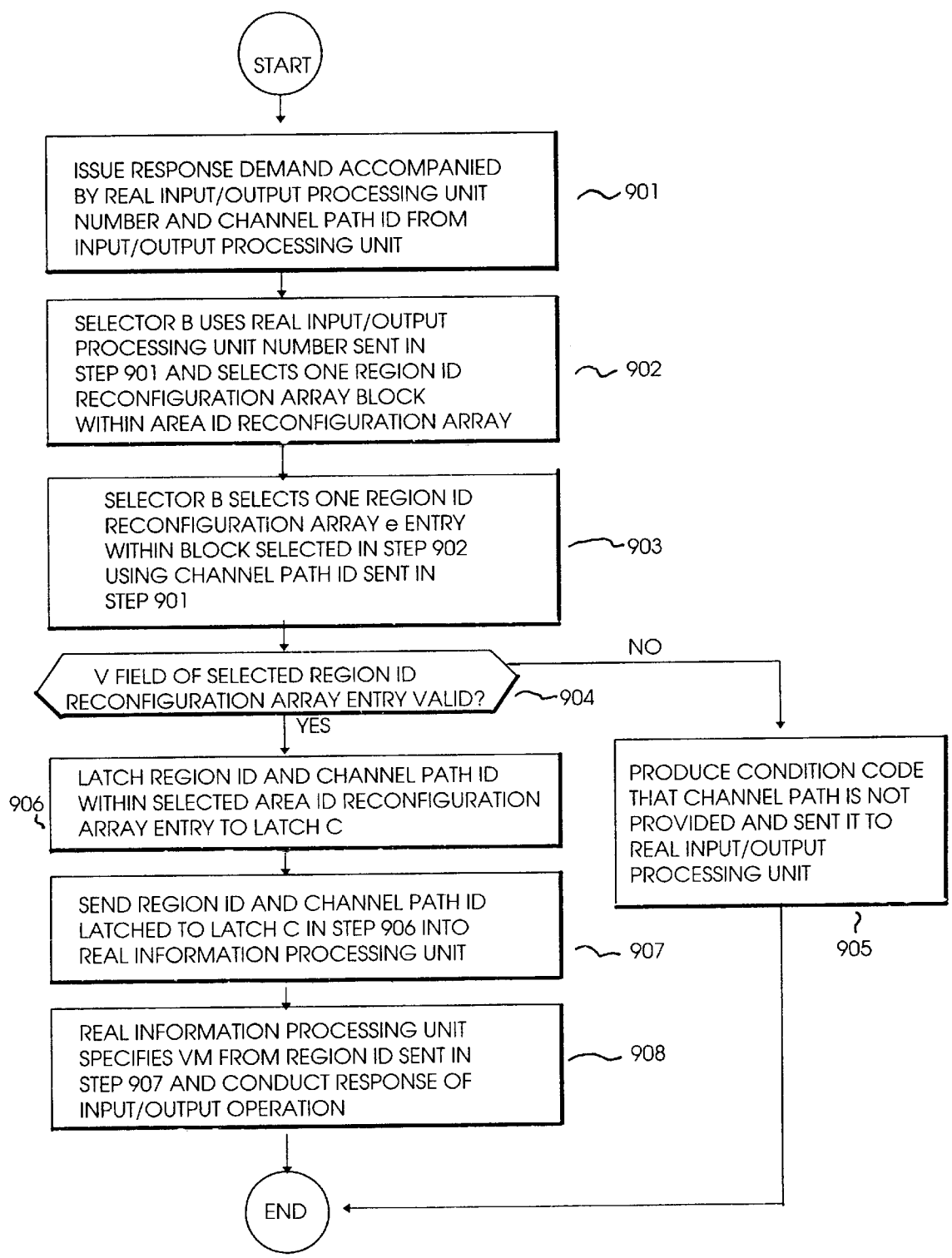
FIG. 9 is a flow chart of processing of selecting a virtual computer using a real input/output processing unit number and a channel path ID issued by a real input/output processing unit.

In FIG. 9, a procedure of using a region ID reconfiguration array from a real input/output processing unit number and a channel path ID, and selecting one virtual computer among a plurality of computers constituting a virtual computer system and executing response of the input/output operation is constituted by step 901 to step 908. The procedure of conversion processing will be described in each step as follows.

Step 901: In order to return a response upon completion of attendant on execution of the input/output operation from a real input/output processing unit to which the Oinput/output operation is started to a LPAR, an input/output operation response command along with a real input/output processing unit number and a channel path ID is issued from the real input/output processing unit to which the input/output operation is started. The input/output operation response command is sent to a signal line 6AA. An input/output channel required by the LPAR is already divided and assigned to a channel path within a plurality of real input/output processing units constituting a real information processing unit. That is, respective region ID reconfiguration array entries of respective region ID reconfiguration arrays 670 constituting an region ID reconfiguration array 670 corresponding to an region ID corresponding to the LPAR are already set to the region ID field and the channel path ID field, in correspondence with a channel path within a plurality of real input/output processing units constituting the input/output channel and the real information processing unit required by the LPAR.

Step 902: A selector B 660 uses a value of a real input/output processing unit number sent through the signal line 6AA, and outputs a block selection command signal commanding that one region ID reconfiguration array block is selected among a plurality of region ID reconfiguration array blocks in a plurality of region ID reconfiguration array blocks 770 constituting the region ID reconfiguration array 670 through a signal line 6AB to the region ID reconfiguration array 670. The region ID reconfiguration array 670 uses a value of the block selection command signal and the real input/output processing unit number sent through the signal line 6AA, and selects one corresponding region ID reconfiguration array block.

Step 903: The selector B 660 uses value of the channel path ID sent through the signal line 6AA, and outputs an entry selection command signal commanding that one region ID reconfiguration array entry is selected among a plurality of region ID reconfiguration array entries within one region ID reconfiguration array block selected in step 902 through the signal line 6AB to the region ID reconfiguration array 670. The region ID reconfiguration array 670 uses value of the entry selection command signal and the channel path ID sent through the signal line 6AB, and selects one region ID reconfiguration array entry among a plurality of region ID reconfiguration array entries within the region ID reconfiguration array block, and sends the content of the selected region ID reconfiguration array entry through the signal line 6AC to a latch C 680.

Step 904: The latch C 680 latches content of one region ID reconfiguration array entry selected among a plurality of region ID reconfiguration array entries within one region ID reconfiguration array block selected among a plurality of region ID reconfiguration array blocks of the region ID reconfiguration array 670 sent through the signal line 6AC, and tests whether the V field of the region ID reconfiguration array entry is valid or invalid. If the V field of the region ID reconfiguration array entry indicates validity, process is advanced to step 906, and if the V field indicates invalidity, process is advanced to step 905.

Step 905: This step is executed when the V field of the selected region ID reconfiguration array entry is invalid. The condition code indicating that an input/output channel path corresponding to the channel path ID issued along with the response demand of the input/output channel is not assigned or not available is reported to the real input/output processing unit in the demand origin, and execution of response of the demanded input/output operation is finished.

Step 906: This step is executed when the V field of the selected region ID reconfiguration array entry is valid. The latch C 680 latches content of the region ID field and the channel path ID field within the region ID reconfiguration array entry of the region ID reconfiguration array block 770 of the region ID reconfiguration array 670.

Step 907: The region ID and the channel path ID latched to the latch C 680 in step 906 are sent through a signal line 6AD to a real information processing unit controlling a virtual computer system.

Step 908: On receiving the region ID and the channel path ID sent in step 907, the real information processing unit specifies a virtual computer to be accessed from the region ID and conducts response of the input/output operation based on the channel path ID.

Details of an embodiment of a procedure have been described where a region ID reconfiguration array is used based on a real input/output processing unit number and a channel path ID, and one virtual computer is selected among a plurality of virtual computers constituting a virtual computer system, and response of the input/output operation is executed.

Next, an embodiment of a procedure will be described using FIG. 6 and FIGS. 7A–7B where content of a channel path reconfiguration array entry within a plurality of channel path reconfiguration array blocks of a channel path reconfiguration array 630 is changed dynamically.

If demand of changing content of the channel path reconfiguration array entry within a plurality of channel path reconfiguration array blocks of the channel path reconfiguration array 630 dynamically is issued from LIP, the region ID and the channel path ID assigned by the demand are sent along with the demand, and the region ID and the channel path ID are inputted respectively through a signal line 6A1 and a signal line 6A2 to a latch A 610.

The region ID sent through the signal line 6A1 is latched to part b of the latch A 610, and the channel path ID sent through the signal line 6A2 is latched to part e of the latch A 610. The latch A 610 latches the region ID and the channel path ID sent through the signal line 6A1 and the signal line 6A2, and sends value of the region ID latched to the part b of the latch A 610 and the channel path ID latched to the part e of the latch A 610 through a signal line 6A4 to a selector A 620.

The selector A 620 uses value of the region ID sent through the signal line 6A4, and sends command that one channel path reconfiguration array block is selected among a plurality of channel path reconfiguration array blocks constituting a channel path reconfiguration array 630 through a signal line 6A6 to the channel path reconfiguration array 630. The channel path reconfiguration array 630 uses the value sent through the signal line 6A6, and selects one corresponding channel path reconfiguration array block.

The selector A 620 uses value of the channel path ID sent through the signal line 6A4, and sends command that one channel path reconfiguration array entry is selected among a plurality of channel path reconfiguration array entries within one selected channel path reconfiguration array block through the signal line 6A6 to the channel path reconfiguration array 630.

The channel path reconfiguration array 630 selects one channel path reconfiguration array entry among a plurality of channel path reconfiguration array entries within the channel path reconfiguration array block, and writes data sent through a signal line 6A3 into the channel path reconfiguration array entry within the selected channel path reconfiguration array block.

Writing operation to a series of channel path reconfiguration array entry is conducted dynamically as above described, thereby a real input/output processing unit number and a channel path number having any region ID and corresponding to any channel path ID can be changed dynamically and arbitrarily. Further the V field of the channel path reconfiguration array entry can be changed from validity into invalidity thereby the channel path ID can be separated dynamically, and the V field of the channel path reconfiguration array entry can be changed from invalidity into validity thereby the status and the connections of an input/output channel path corresponding to a channel path ID can be performed dynamically.

Next, an embodiment of procedure will be described using FIG. 6 and FIGS. 7A–7B where content of an region ID reconfiguration array entry within a plurality of region ID reconfiguration array blocks of an region ID reconfiguration array 670 is changed dynamically.

If a demand that content of the region ID reconfiguration array entry within a plurality of region ID reconfiguration array blocks of the region ID reconfiguration array 670 is changed dynamically is issued from a real information processing unit controlling a virtual computer system, a real input/output processing unit number and a channel path ID assigned in the demand are sent along with the demand, and the real input/output processing unit number and the channel path ID are inputted respectively through a signal line 6B1 and through a signal line 6B2 to a latch D 690. The real input/output processing unit number sent through the signal line 6B1 is latched to part i of the latch D 690, and the channel path ID sent through the signal line 6B2 is latched to part p of the latch D 690.

The latch D 690 latches the real input/output processing unit number and the channel path ID sent through the signal line 6B1 and the signal line 6B2, and sends value of the real input/output processing unit number latched to the part i of the latch D 690 and the channel path ID latched to the part p of the latch D 690 through a signal line 6B4 to a selector B 660. The selector B 660 uses value of the real input/output processing unit number sent through the signal line 6B4, and sends command that one region ID reconfiguration array block is selected among a plurality of region ID reconfiguration array blocks constituting the region ID reconfiguration array 670 through a signal line 6AB to the region ID reconfiguration array 670. The region ID reconfiguration array 670 uses value sent through the signal line 6AB, and selects one corresponding region ID reconfiguration array block.

The selector B 660 uses value of the channel path ID sent through the signal line 6B5, and sends command that one region ID reconfiguration array entry is selected among a plurality of region ID reconfiguration array entries within one selected region ID reconfiguration array block through the signal line 6AB to the region ID reconfiguration array 670. The region ID reconfiguration array 670 selects one region ID reconfiguration array entry among a plurality of region ID reconfiguration array entries within the region ID reconfiguration array block, and writes data sent through a signal line 6AE into the region ID reconfiguration array entry within the selected region ID reconfiguration array block.

Writing operation to a series of region ID reconfiguration array entry is conducted dynamically as above described. Thus, a region ID and a channel path number having any real input/output processing unit number and corresponding to any channel path ID can be changed dynamically and arbitrarily. Further, the V field of the region ID reconfiguration array entry can be changed from validity into invalidity thereby the channel path ID can be separated dynamically, and the V field of the region ID reconfiguration array entry can be changed from invalidity into validity thereby the channel path ID can be connected dynamically.

In the present invention as above described, each region ID of the channel reconfiguration array group is assigned to a LPAR, a channel path ID is provided independently and in the number which can be assigned by the maximum data width defined by the hardware architecture of the real information processing unit. A channel path reconfiguration array block is provided, and a channel path reconfiguration array is constituted by a plurality of channel path reconfiguration array blocks. A plurality of channel path reconfiguration array entries are provided within each channel path reconfiguration array block.

One channel path reconfiguration array block is selected among a plurality of channel path reconfiguration array blocks using a value of a real input/output processing unit number sent by the real information processing unit, and one channel path reconfiguration array entry is selected among a plurality of channel path reconfiguration array entries using a value of a channel path ID sent by the real information processing unit.

The selected channel path reconfiguration array entry has a real input/output processing unit number field having an input/output processing unit number indicating to which real input/output processing unit constituting the input/output channel it corresponds. When a logic central processing unit of a virtual computer accesses the input/output channel, a channel path reconfiguration array block corresponding to a region ID sent by the central processing unit is selected, and further using a channel path ID sent simultaneously, one channel path reconfiguration array entry within the channel path reconfiguration array block is selected and its content is read out.

A real input/output processing unit number being a content of the read-out channel path reconfiguration array entry is sent to a plurality of constituted real input/output processing units, and a corresponding real input/output processing unit is selected. Further in the present invention, a region ID reconfiguration array group is provided. Real input/output processing unit numbers, and respective channel path IDs are provided individually and in the number to be assigned by the maximum data width defined by the hardware architecture of the real information processing unit. The region ID reconfiguration array is constituted by a plurality of region ID reconfiguration array blocks, and a plurality of region ID reconfiguration array entries are provided within each region ID reconfiguration array block.

One region ID reconfiguration array block is selected among a plurality of region ID reconfiguration array blocks using a value of an region ID sent by the real input/output processing unit, and one region ID reconfiguration array entry is selected among a plurality of region ID reconfiguration array entries within the region ID reconfiguration array block using value of a channel path ID sent by the real input/output processing unit.

The selected region ID reconfiguration array entry indicates to which virtual computer constituting the virtual computer system corresponds the region ID and the channel path ID respectively. When the real input/output processing unit accesses the virtual computer, an region ID reconfiguration array block corresponding to a real input/output processing unit number sent by the real input/output processing unit is selected. Further using a channel path ID sent simultaneously, one region ID reconfiguration array entry within the region ID reconfiguration array block is selected and its content is read out. The region ID and the channel path ID being a content of the read-out region ID reconfiguration array entry are sent to the real information processing unit and a corresponding virtual computer is selected.

Function is provided as described above, and channel path reconfiguration array blocks are provided individually each region is ID assigned to respective LPARs. Each channel path reconfiguration array block is provided with channel path reconfiguration array entries up to the number to be assigned to the maximum data width defined by the hardware architecture of the real information processing unit. Region ID reconfiguration array blocks are provided individually with respective to real input/output processing units, and one region ID reconfiguration array block is provided with region ID reconfiguration array entries up to the number to be assigned to the maximum data width defined by the hardware architecture of the real information processing unit. Thus, in a plurality of LPARs respectively, the input/output channel can be used to the maximum data width (for example, 8 bits) of the channel path ID defined by the hardware architecture of the real information processing unit.

As a result, without changing hardware architecture of a real information processing unit constituting an input/output channel, in an information processing unit as a whole, the input/output channels beyond the maximum input/output channel number defined by the basic hardware architecture of the information processing unit can be accessed concurrently from a plurality of LPARs.

Further during assigning channel paths to the LPARs, when a part of the channel path group is separated from or connected to the OS acting on the LPAR using an off-line command or an on-line command, the V field of the channel path reconfiguration array entry preserved as hardware in the channel path reconfiguration array is changed to validity or invalidity, and at the same time the V field of the region ID reconfiguration array entry preserved as hardware in the region ID reconfiguration array is changed to validity or invalidity. Thus, dynamic reconfiguration function of input/ output channel having function of changing dynamically the position and the number of one or plural input/output channels within the input/output channel can be realized.

Further the real input/output processing unit number field and the channel path ID field corresponding to the channel path reconfiguration array entry preserved as hardware in the channel path reconfiguration array are changed, and at the same time the region ID field and the channel path ID field corresponding to the region ID reconfiguration array entry preserved as hardware in the region ID reconfiguration array are changed. Thus, the correspondence of the input/output channel and the real input/output processing unit assigned to the LPAR can be changed dynamically.

As a result, without changing the hardware architecture relating to the channel path of the input/output channel used in the LPAR, in an information processing unit as a whole, the input/output channels beyond the maximum input/output channel number defined by the basic hardware architecture of the information processing unit can be used concurrently. Further, an extending system and logic dividing system of input/output channels improving the operability of system and the use efficiency of the real input/output channels can be realized.

In this example, although the extending system and the logic dividing system of the input/output channels using the hardware logic have been exemplified, of course, the microprogram control may be done.

According to the present invention, without changing the hardware architecture of the real information processing unit, the compatibility of the program acting on the LPAR can be maintained. Further, without widening the data width of the channel path ID defined by the hardware architecture of the real information processing unit, while the rapid increase of the hardware logic of the information processing unit is suppressed, the maximum input/output channel number defined by the hardware architecture of the real information processing unit can be used in a plurality of LPARs respectively. Thus, the industrial cost is suppressed and the extensibility of the system is made flexible and the performance of the virtual computer can be significantly improved.

While the present invention has been described in detail and pictorially in the accompanying drawings it is not limited to such details since many changes and modifications recognizable to those of ordinary skill in the art may be made to the invention without departing from the spirit and the scope thereof.

I claim:

1. An information processing system including a central processing unit, a memory device and an input/output channel wherein a plurality of virtual computers act on said central processing unit, comprising:

a plurality of input/output processing units included in said input/output channel;

wherein each virtual computer issues a region ID which identifies said virtual computer and a channel path ID which identifies an input/output channel to be used to access one of said input/output processing units;

a channel path reconfiguration array having a plurality of channel path reconfiguration array blocks corresponding to region IDs, each channel path reconfiguration array block comprises a plurality of channel path reconfiguration array entries corresponding to channel path IDs, each channel path reconfiguration array entry having an input/output processing unit number and a channel path ID; and selecting means for selecting a channel path reconfiguration array block within said channel path reconfiguration array corresponding to said region ID issued by said virtual computer and selecting a channel path reconfiguration array entry corresponding to said channel path ID issued by said virtual computer within the selected channel path reconfiguration array block, wherein said virtual computer selects one of said input/output processing units corresponding to the input/output processing number from the selected channel path reconfiguration array entry and accesses the input/output processing unit using the channel path ID from the selected channel path reconfiguration array entry.

2. An information processing system according to claim 1, further comprising:

changing means for changing contents of said channel path reconfiguration array in response to a changing demand issued from said virtual computer, wherein said changing means stores an input/output processing unit number and a channel path ID in a channel path reconfiguration array entry of a channel path reconfiguration array block within said channel path reconfiguration array selected by said selecting means based on a region ID and a channel path ID issued by said virtual computer along with said changing demand.

3. An information processing system according to claim 2, further comprising:

wherein said virtual computer issues the region ID and the channel path ID and accesses said input/output processing unit and said input/output processing unit issues an input/output processing unit number and a channel path ID to said virtual computer as a response to an access, a region ID reconfiguration array having a plurality of region ID reconfiguration array blocks corresponding to input/output processing unit numbers, each region ID configuration block comprises a plurality of region ID reconfiguration array entries corresponding to channel path IDs, each region ID configuration array entry having a region ID and a channel path ID; and second selecting means for selecting a region ID reconfiguration array block within said region ID reconfiguration array corresponding to an input/output processing unit number issued as a response to an access by said input/output processing unit and selecting a region ID reconfiguration array entry from the selected region ID reconfiguration array block corresponding to the channel ID issued as a response to said access by said input/output processing unit;

wherein one of said input/output processing units corresponding to the input/output processing unit number issues a response to a virtual computer corresponding to the region ID from the selected region ID reconfiguration array entry.

4. An information processing system according to claim 3, further comprising:

second changing means for changing contents of said region ID reconfiguration array in response to a second changing demand issued from said virtual computer, wherein said second changing means stores a region ID and a channel path ID in a region ID reconfiguration array entry of a region ID reconfiguration array block within said region ID reconfiguration array selected by said second selecting means based on an input/output processing unit number and a channel path ID issued by said virtual computer along with said second changing demand.

5. An information processing system according to claim 4, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

6. An information processing system according to claim 5, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

7. An information processing system according to claim 4, wherein each region ID reconfiguration array entry includes a validity display field indicating whether the region ID reconfiguration array entry is valid or invalid, a region ID field storing a region ID and a channel path ID field storing a channel path ID.

8. An information processing system according to claim 7, further comprising:

means for, when the validity display field of a selected region ID reconfiguration array entry indicates invalidity, reporting a condition code that a channel path ID associated with the access is not provided to the input/output processing unit issuing the response and, when the validity display field indicates validity, selecting a virtual computer corresponding to the region ID of the region ID field and conducting a response to the selected virtual computer by the channel path corresponding to the channel path ID of the channel path ID field.

9. An extending system according to claim 8, further comprising:

changing means for changing contents of said channel path reconfiguration array in response to a changing demand issued from said virtual computer, wherein said changing means stores an input/output processing unit number and a channel path ID in a channel path reconfiguration array entry of a channel path reconfiguration array block within said channel path reconfiguration array selected by said selecting means based on a region ID and a channel path ID issued by said virtual computer along with said changing demand.

10. An extending system according to claim 9, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

11. An extending system according to claim 10, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

12. An extending system according to claim 8, further comprising:

wherein said virtual computer issues the region ID and the channel path ID and accesses said input/output processing unit and said input/output processing unit issues an input/output processing unit number and a channel path ID to said virtual computer as a response to an access, a region ID reconfiguration array having a plurality of region ID reconfiguration array blocks corresponding to input/output processing unit numbers, each region ID configuration block comprises a plurality of region ID reconfiguration array entries corresponding to channel path IDs, each region ID configuration array entry having a region ID and a channel path ID; and second selecting means for selecting a region ID reconfiguration array block within said region ID reconfiguration array corresponding to an input/output processing unit number issued as a response to an access by said input/output processing unit and selecting a region ID reconfiguration array entry from the selected region ID reconfiguration array block corresponding to the channel ID issued as a response to said access by said input/output processing unit;

wherein one of said input/output processing units corresponding to the input/output processing unit number issues a response to a virtual computer corresponding to the region ID from the selected region ID reconfiguration array entry.

13. An extending system according to claim 12, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

14. An extending system according to claim 13, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

15. An extending system according to claim 12, further comprising:

changing means for changing contents of said region ID reconfiguration array in response to a changing demand issued from said virtual computer, wherein said changing means stores a region ID and a channel path ID in a region ID reconfiguration array entry of a region ID reconfiguration array block within said region ID reconfiguration array selected by said second selecting means based on an input/output processing unit number and a channel path ID issued by said virtual computer along with said changing demand.

16. An extending system according to claim 15, wherein each region ID reconfiguration array entry includes a validity display field indicating whether the region ID reconfiguration array entry is valid or invalid, a region ID field storing a region ID and a channel path ID field storing a channel path ID.

17. An extending system according to claim 16, further comprising:

means for, when the validity display field of a selected region ID reconfiguration array entry indicates invalidity, reporting a condition code that a channel path ID associated with the access is not provided to the input/output processing unit issuing the response and, when the validity display field indicates validity, selecting a virtual computer corresponding to the region ID of the region ID field and conducting a response to the selected virtual computer by the channel path corresponding to the channel path ID of the channel path ID field.

18. An extending system according to claim 15, wherein each channel path reconfiguration array entry includes a validity display field indicating whether the channel path reconfiguration array entry is valid or invalid, an input/output processing unit number field for storing an input/ output processing unit number and a channel path ID field for storing a channel path ID.

19. An extending system according to claim 18, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

20. An extending system according to claim 12, wherein each region ID reconfiguration array entry includes a validity display field indicating whether the region ID reconfiguration array entry is valid or invalid, a region ID field storing a region ID and a channel path ID field storing a channel path ID.

21. An extending system according to claim 20, further comprising:

means for, when the validity display field of a selected region ID reconfiguration array entry indicates invalidity, reporting a condition code that a channel path ID associated with the access is not provided to the input/output processing unit issuing the response and, when the validity display field indicates validity, selecting a virtual computer corresponding to the region ID of the region ID field and conducting a response to the selected virtual computer by the channel path corresponding to the channel path ID of the channel path ID field.

22. An information processing system according to claim 3, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

23. An information processing system according to claim 22, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

24. An information processing system according to claim 3, wherein each region ID reconfiguration array entry includes a validity display field indicating whether the region ID reconfiguration array entry is valid or invalid, a region ID field storing a region ID and a channel path ID field storing a channel path ID.

25. An information processing system according to claim 24, further comprising:

means for, when the validity display field of a selected region ID reconfiguration array entry indicates invalidity, reporting a condition code that a channel path ID associated with the access is not provided to the input/output processing unit issuing the response and, when the validity display field indicates validity, selecting a virtual computer corresponding to the region ID of the region ID field and conducting a response to the selected virtual computer by the channel path corresponding to the channel path ID of the channel path ID field.

26. An information processing system according to claim 2, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

27. An information processing system according to claim 26, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

28. An information processing system according to claim 1, further comprising:

wherein said virtual computer issues the region ID and the channel path ID and accesses said input/output processing unit and said input/output processing unit issues an input/output processing unit number and a channel path ID to said virtual computer as a response to an access, a region ID reconfiguration array having a plurality of region ID reconfiguration array blocks corresponding to input/output processing unit numbers, each region ID configuration block comprises a plurality of region ID reconfiguration array entries corresponding to channel path IDs, each region ID configuration array entry having a region ID and a channel path ID; and second selecting means for selecting a region ID reconfiguration array block within said region ID reconfiguration array corresponding to an input/output processing unit number issued as a response to an access by said input/output processing unit and selecting a region ID reconfiguration array entry from the selected region ID reconfiguration array block corresponding to the channel ID issued as a response to said access by said input/output processing unit;

wherein one of said input/output processing units corresponding to the input/output processing unit number issues a response to a virtual computer corresponding to the region ID from the selected region ID reconfiguration array entry.

29. An information processing system according to claim 28 wherein each region ID reconfiguration array entry includes a validity display field indicating whether the region ID reconfiguration array entry is valid or invalid, a region ID field storing a region ID and a channel path ID field storing a channel path ID.

30. An information processing system according to claim 29, further comprising:

means for, when the validity display field of a selected region ID reconfiguration array entry indicates invalidity, reporting a condition code that a channel path ID associated with the access is not provided to the input/output processing unit issuing the response and, when the validity display field indicates validity, selecting a virtual computer corresponding to the region ID of the region ID field and conducting a response to the selected virtual computer by the channel path corresponding to the channel path ID of the channel path ID field.

31. An information processing system according to claim 28, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

32. An information processing system according to claim 31, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

33. An information processing system according to claim 28, further comprising:

changing means for changing contents of said region ID reconfiguration array in response to a changing demand issued from said virtual computer, wherein said changing means stores a region ID and a channel path ID in a region ID reconfiguration array entry of a region ID reconfiguration array block within said region ID reconfiguration array selected by said second selecting means based on an input/output processing unit number and a channel path ID issued by said virtual computer along with said changing demand.

34. An information processing system according to claim 33, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

35. An information processing system according to claim 34, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

36. An information processing system according to claim 33, wherein each region ID reconfiguration array entry includes a validity display field indicating whether the region ID reconfiguration array entry is valid or invalid, a region ID field storing a region ID and a channel path ID field storing a channel path ID.

37. An information processing system according to claim 36, further comprising:

means for, when the validity display field of a selected region ID reconfiguration array entry indicates invalidity, reporting a condition code that a channel path ID associated with the access is not provided to the input/output processing unit issuing the response and, when the validity display field indicates validity, selecting a virtual computer corresponding to the region ID of the region ID field and conducting a response to the selected virtual computer by the channel path corresponding to the channel path ID of the channel path ID field.

38. An information processing system according to claim 1, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

39. An information processing system according to claim 38, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

40. An extending system for extending an input/output channel of an information processing system, wherein a plurality of virtual computers are operated on said information processing unit, wherein a plurality of input/output processing units are included in said input/output channel, and wherein each virtual computer issues a region ID which identifies a virtual computer and a channel path ID which identifies an input/output channel to be used to access one of said input/output processing units, said extending system comprising:

a channel path reconfiguration array having a plurality of channel path reconfiguration array blocks corresponding to region IDs, each channel path reconfiguration array block comprises a plurality of channel path reconfiguration array entries corresponding to channel path IDs, each channel path reconfiguration array entry having an input/output processing unit number and a channel path ID; and selecting means for selecting a channel path reconfiguration array block within said channel path reconfiguration array corresponding to said region ID issued by said virtual computer and selecting a channel path reconfiguration array entry corresponding to said channel path ID issued by said virtual computer within the selected channel path reconfiguration array block, wherein said virtual computer selects one of said input/output processing units corresponding to the input/output processing number from the selected channel path reconfiguration array entry and accesses the input/output processing unit using the channel path ID from the selected channel path reconfiguration array entry.

41. An extending system according to claim 40, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

42. An extending system according to claim 41, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

43. An extending system according to claim 40, further comprising:

wherein said virtual computer issues the region ID and the channel path ID and accesses said input/output processing unit and said input/output processing unit issues an input/output processing unit number and a channel path ID to said virtual computer as a response to an access, a region ID reconfiguration array having a plurality of region ID reconfiguration array blocks corresponding to input/output processing unit numbers, each region ID configuration block comprises a plurality of region ID reconfiguration array entries corresponding to channel path IDs, each region ID configuration array entry having a region ID and a channel path ID; and second selecting means for selecting a region ID reconfiguration array block within said region ID reconfiguration array corresponding to an input/output processing unit number issued as a response to an access by said input/output processing unit and selecting a region ID reconfiguration array entry from the selected region ID reconfiguration array block corresponding to the channel ID issued as a response to said access by said input/output processing unit;

wherein one of said input/output processing units corresponding to the input/output processing unit number issues a response to a virtual computer corresponding to the region ID from the selected region ID reconfiguration array entry.

44. An extending system according to claim 43, wherein each region ID reconfiguration array entry includes a validity display field indicating whether the region ID reconfiguration array entry is valid or invalid, a region ID field storing a region ID and a channel path ID field storing a channel path ID.

45. An extending system according to claim 44, further comprising:

means for, when the validity display field of a selected region ID reconfiguration array entry indicates invalidity, reporting a condition code that a channel path ID associated with the access is not provided to the input/output processing unit issuing the response and, when the validity display field indicates validity, selecting a virtual computer corresponding to the region ID of the region ID field and conducting a response to the selected virtual computer by the channel path corresponding to the channel path ID of the channel path ID field.

46. An extending system according to claim 43, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

47. An extending system according to claim 46, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

48. An extending processing system according to claim 43, further comprising:

second changing means for changing contents of said region ID reconfiguration array in response to a second changing demand issued from said virtual computer, wherein said second changing means stores a region ID and a channel path ID in a region ID reconfiguration array entry of a region ID reconfiguration array block within said region ID reconfiguration array selected by said second selecting means based on an input/output processing unit number and a channel path ID issued by said virtual computer along with said second changing demand.

49. An extending system according to claim 48, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

50. An extending system according to claim 49, further comprising:

means for, when the validity display field of a selected channel path reconfiguration array entry indicates invalidity, reporting a condition code that a channel path ID associated with the access is not provided to the input/output channel and, when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

51. An extending system according to claim 48, wherein each region ID reconfiguration array entry includes a validity display field indicating whether the region ID reconfiguration array entry is valid or invalid, a region ID field storing a region ID and a channel path ID field storing a channel path ID.

52. An extending system according to claim 51, further comprising:

means for, when the validity display field of a selected region ID reconfiguration array entry indicates invalidity, reporting a condition code that a channel path ID associated with the access is not provided to the input/output processing unit issuing the response and, when the validity display field indicates validity, selecting a virtual computer corresponding to the region ID of the region ID field and conducting a response to the selected virtual computer by the channel path corresponding to the channel path ID of the channel path ID field.

53. A method of extending an input/output channel of an information processing system, wherein a plurality of virtual computers are operated on said information processing unit, wherein a plurality of input/output processing units are included in said input/output channel, and wherein each virtual computer issues a region ID which identifies a virtual computer and a channel path ID which identifies an input/output channel to be used to access one of said input/output processing units, said method comprising the steps of:

selecting a channel path reconfiguration array block within a channel path reconfiguration array corresponding to said region ID issued by said virtual computer;

selecting a channel path reconfiguration array entry corresponding to said channel path ID issued by said virtual computer within the selected channel path reconfiguration array block;

selecting one of said input/output processing units corresponding to an input/output processing number included in the selected channel path reconfiguration array entry; and accessing the input/output processing unit using a channel path ID included in the selected channel path reconfiguration array entry.

54. A method according to claim 53, further comprising the steps of:

changing contents of said channel path reconfiguration array in response to a changing demand issued from said virtual computer; and storing an input/output processing unit number and a channel path ID in a channel path reconfiguration array entry of a channel path reconfiguration array block within a selected channel path reconfiguration array corresponding to a region ID and a channel path ID issued by said virtual computer along with said changing demand.

55. A method according to claim 54, wherein each region ID reconfiguration array entry includes a validity display field indicating whether the region ID reconfiguration array entry is valid or invalid, a region ID field storing a region ID and a channel path ID field storing a channel path ID.

56. A method according to claim 55, further comprising the steps of:

when the validity display field of a selected region ID reconfiguration array entry indicates invalidity, reporting a condition code that a channel path ID associated with the access is not provided to the input/output processing unit issuing the response; and when the validity display field indicates validity, selecting a virtual computer corresponding to the region ID of the region ID field and conducting a response to the selected virtual computer by the channel path corresponding to the channel path ID of the channel path ID field.

57. A method according to claim 54, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

58. A method according to claim 57, further comprising the steps of:

when the validity display field of a selected channel path reconfiguration array entry indicates invalidity, reporting a condition code that a channel path ID associated with the access is not provided to the input/output channel; and when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

59. A method according to claim 54, further comprising the steps of:

changing contents of said region ID reconfiguration array in response to a changing demand issued from said virtual computer; and storing a region ID and a channel path ID in a region ID reconfiguration array entry of a region ID reconfiguration array block within a selected region ID reconfiguration array corresponding to an input/output processing unit number and a channel path ID issued by said virtual computer along with said changing demand.

60. A method according to claim 59, wherein each region ID reconfiguration array entry includes a validity display field indicating whether the region ID reconfiguration array entry is valid or invalid, a region ID field storing a region ID and a channel path ID field storing a channel path ID.

61. A method according to claim 60, further comprising the steps of:

when the validity display field of a selected region ID reconfiguration array entry indicates invalidity, reporting a condition code that a channel path ID associated with the access is not provided to the input/output processing unit issuing the response; and when the validity display field indicates validity, selecting a virtual computer corresponding to the region ID of the region ID field and conducting a response to the selected virtual computer by the channel path corresponding to the channel path ID of the channel path ID field.

62. A method according to claim 59, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

63. A method according to claim 62, further comprising the steps of:

when the validity display field of a selected channel path reconfiguration array entry indicates invalidity, reporting a condition code that a channel path ID associated with the access is not provided to the input/output channel; and when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

64. A method according to claim 54, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

65. A method according to claim 64, further comprising:

when the validity display field of a selected channel path reconfiguration array entry indicates invalidity, reporting a condition code that a channel path ID associated with the access is not provided to the input/output channel; and when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

66. A method according to claim 53, further comprising the steps of:

wherein said virtual computer issues the region ID and the channel path ID and accesses said input/output processing unit and said input/output processing unit issues an input/output processing unit number and a channel path ID to said virtual computer as a response to an access, selecting a region ID reconfiguration array block within a region ID reconfiguration array corresponding to an input/output processing unit number issued as a response to an access by said input/output processing unit;

selecting a region ID reconfiguration array entry from the selected region ID reconfiguration array block corresponding to a channel ID issued as a response to said access by said input/output processing unit; and issuing by one of said input/output processing units corresponding to said input/output processing unit number a response to a virtual computer corresponding to a region ID included in the selected region ID reconfiguration array entry.

67. A method according to claim 66, wherein each region ID reconfiguration array entry includes a validity display field indicating whether the region ID reconfiguration array entry is valid or invalid, a region ID field storing a region ID and a channel path ID field storing a channel path ID.

68. A method according to claim 67, further comprising the steps of:

when the validity display field of a selected region ID reconfiguration array entry indicates invalidity, reporting a condition code that a channel path ID associated with the access is not provided to the input/output processing unit issuing the response; and when the validity display field indicates validity, selecting a virtual computer corresponding to the region ID of the region ID field and conducting a response to the selected virtual computer by the channel path corresponding to the channel path ID of the channel path ID field.

69. A method according to claim 66, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

70. A method according to claim 69, further comprising the steps of:

when the validity display field of a selected channel path reconfiguration array entry indicates invalidity, reporting a condition code that a channel path ID associated with the access is not provided to the input/output channel; and when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

71. A method according to claim 66, further comprising the steps of:

changing contents of said region ID reconfiguration array in response to a second changing demand issued from said virtual computer; and storing a region ID and a channel path ID in a region ID reconfiguration array entry of a region ID reconfiguration array block within a selected region ID reconfiguration array corresponding to an input/output processing unit number and a channel path ID issued by said virtual computer along with said second changing demand.

72. A method according to claim 71, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

73. A method according to claim 72, further comprising the steps of:

when the validity display field of a selected channel path reconfiguration array entry indicates invalidity, reporting a condition code that a channel path ID associated with the access is not provided to the input/output channel; and when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

74. A method according to claim 71, wherein each region ID reconfiguration array entry includes a validity display field indicating whether the region ID reconfiguration array entry is valid or invalid, a region ID field storing a region ID and a channel path ID field storing a channel path ID.

75. A method according to claim 74, further comprising the steps of:

when the validity display field of a selected region ID reconfiguration array entry indicates invalidity, reporting a condition code that a channel path ID associated with the access is not provided to the input/output processing unit issuing the response; and when the validity display field indicates validity, selecting a virtual computer corresponding to the region ID of the region ID field and conducting a response to the selected virtual computer by the channel path corresponding to the channel path ID of the channel path ID field.

76. A method according to claim 53, further comprising the steps of:

wherein said virtual computer issues the region ID and the channel path ID and accesses said input/output processing unit and said input/output processing unit issues an input/output processing unit number and a channel path ID to said virtual computer as a response to an access, selecting a region ID reconfiguration array block within a region ID reconfiguration array corresponding to an input/output processing unit number issued as a response to an access by said input/output processing unit; and selecting a region ID reconfiguration array entry from the selected region ID reconfiguration array block corresponding to a channel ID issued as a response to said access by said input/output processing unit; and issuing by one of said input/output processing units corresponding to said input/output processing unit number a response to a virtual computer corresponding to a region ID included in the selected region ID reconfiguration array entry.

77. A method according to claim 53, wherein each channel path reconfiguration array entry includes a validity display field indicating whether the channel path reconfiguration array entry is valid or invalid, an input/output processing unit number field for storing an input/output processing unit number and a channel path ID field for storing a channel path ID.

78. A method according to claim 77, further comprising the steps of:

when the validity display field of a selected channel path reconfiguration array entry indicates invalidity, reporting a condition code that a channel path ID associated with the access is not provided to the input/output channel; and when the validity display field indicates validity, selecting an input/output processing unit based on the input/output processing unit number of the input/output processing unit number field of the selected channel path reconfiguration array entry and accessing the selected input/output processing unit by the channel path ID from the channel path ID field of the selected channel path reconfiguration array entry.

* * * * *